＝
US010821582B2

(12) United States Patent
Rode et al.

(10) Patent No.: US 10,821,582 B2
(45) Date of Patent: Nov. 3, 2020

(54) SYSTEMS AND METHODS FOR PRELOADING A BEARING AND INSTALLING A TAMPER INDICATING MEMBER

(71) Applicant: TEMPER AXLE PRODUCTS CORPORATION, Fonda, NY (US)

(72) Inventors: John E. Rode, Fonda, NY (US); Sean E. Strait, Fort Plain, NY (US)

(73) Assignee: Temper Axle Products Corporation, Fonda, NY (US)

( * ) Notice: Subject to any disclaimer, the term of this patent is extended or adjusted under 35 U.S.C. 154(b) by 257 days.

(21) Appl. No.: 16/110,715

(22) Filed: Aug. 23, 2018

(65) Prior Publication Data
US 2019/0001471 A1 Jan. 3, 2019

Related U.S. Application Data

(60) Continuation of application No. 15/399,473, filed on Jan. 5, 2017, now Pat. No. 10,086,505, which is a
(Continued)

(51) Int. Cl.
*B25B 27/02* (2006.01)
*F16C 41/00* (2006.01)
(Continued)

(52) U.S. Cl.
CPC .......... *B25B 27/023* (2013.01); *B25B 27/026* (2013.01); *B25B 27/062* (2013.01);
(Continued)

(58) Field of Classification Search
CPC ..... B25B 27/023; B25B 27/06; B25B 27/062; Y10T 29/49696; Y10T 29/497
(Continued)

(56) References Cited

U.S. PATENT DOCUMENTS

| 518,328 A | 4/1894 | Oakey |
|---|---|---|
| 578,276 A | 3/1897 | Strauss |

(Continued)

FOREIGN PATENT DOCUMENTS

| CN | 102699875 A | 10/2012 |
|---|---|---|
| DE | 3905385 A1 | 8/1990 |

(Continued)

OTHER PUBLICATIONS

"STEMCO Pro-Torq® Advanced Axle Spindle Nuts 09-571-0006," Instruction guide, Copyright Aug. 2003, 2 pages.
(Continued)

*Primary Examiner* — Jason L Vaughan
(74) *Attorney, Agent, or Firm* — Heslin Rothenberg Farley & Mesiti P.C.; Victor A. Cardona, Esq.

(57) ABSTRACT

An apparatus for use in connecting a cover member to a retaining member coupled to a nut mounted to a shaft includes a body portion, arms, and a plurality of pressing members. The arms extend from the body portion relative to the nut such that contacting portions of the arms contact a rear side of the nut to connect the body portion to the nut. The plurality of pressing members extend from the body portion and is alignable with the plurality of tabs of a cover member when the cover member is located between the body and the nut. The body portion includes a press mechanism configured to cause a first pressing member of the pressing members to contact a first tab of the cover member to deform the first tab toward a retaining member coupled to the nut mounted on the shaft.

11 Claims, 26 Drawing Sheets

Related U.S. Application Data division of application No. 15/153,020, filed on May 12, 2016, now Pat. No. 9,566,699.

(51) Int. Cl.
  *B25B 27/06* (2006.01)
  *F16C 35/078* (2006.01)
  *F16B 39/12* (2006.01)

(52) U.S. Cl.
  CPC .......... *B25B 27/064* (2013.01); *F16C 35/078* (2013.01); *F16C 41/008* (2013.01); *F16B 39/12* (2013.01); *F16C 2229/00* (2013.01); *Y10T 29/497* (2015.01); *Y10T 29/49696* (2015.01)

(58) Field of Classification Search
  USPC .......................... 29/256, 258, 260, 261, 262
  See application file for complete search history.

(56) References Cited

U.S. PATENT DOCUMENTS

| | | | |
|---|---|---|---|
| 1,352,643 A | 9/1920 | Young | |
| 1,366,273 A | 1/1921 | Nettlefold | |
| 1,373,489 A | 4/1921 | Royal-Cochran | |
| 1,384,655 A | 7/1921 | Allmon | |
| 1,440,938 A | 1/1923 | Sieroslawski | |
| 1,648,189 A * | 11/1927 | Ottinger | B21D 39/20 72/393 |
| 1,755,807 A | 4/1930 | Boles | |
| 1,758,515 A | 5/1930 | Heiermann | |
| 2,301,786 A | 11/1942 | Millermaster | |
| 2,426,219 A | 8/1947 | Jackson | |
| 2,755,698 A | 7/1956 | Wurzel | |
| 2,769,360 A | 11/1956 | Woodford | |
| 2,813,732 A | 11/1957 | Hird | |
| 3,144,909 A | 8/1964 | Hart et al. | |
| 3,241,409 A | 3/1966 | Raptis | |
| 3,316,952 A | 5/1967 | Hollinger | |
| 3,464,474 A | 9/1969 | Jansen | |
| 3,480,300 A | 11/1969 | Jeffrey et al. | |
| 3,522,830 A | 8/1970 | Blizard | |
| 3,581,609 A | 6/1971 | Greenwood | |
| 3,664,226 A | 5/1972 | Gonzalez | |
| 3,678,981 A | 7/1972 | Heyworth | |
| 3,742,568 A | 3/1973 | Hahlbeck | |
| 3,762,455 A | 10/1973 | Anderson, Jr. | |
| 3,844,323 A | 10/1974 | Anderson, Jr. | |
| 3,986,750 A | 10/1976 | Trent et al. | |
| 4,048,897 A | 9/1977 | Price, Jr. | |
| 4,054,999 A | 10/1977 | Harbottle | |
| 4,210,372 A | 1/1980 | McGee et al. | |
| 4,305,438 A | 12/1981 | Spinosa et al. | |
| 4,436,468 A | 3/1984 | Ozaki et al. | |
| 4,593,924 A | 6/1986 | Cabeza | |
| 4,812,094 A | 3/1989 | Grube | |
| 4,958,941 A | 9/1990 | Imanari | |
| 4,971,501 A | 11/1990 | Chavez | |
| 5,011,306 A | 4/1991 | Martinie | |
| 5,058,424 A | 10/1991 | O'Hara | |
| 5,070,621 A | 12/1991 | Butler et al. | |
| 5,129,156 A | 7/1992 | Walker | |
| 5,180,265 A | 1/1993 | Weise | |
| 5,251,995 A | 10/1993 | Chi | |
| 5,362,111 A | 8/1994 | Harbin | |
| 5,348,349 A | 9/1994 | Sloane | |
| 5,349,736 A | 9/1994 | Rubino et al. | |
| 5,366,300 A | 11/1994 | Deane et al. | |
| 5,533,849 A | 7/1996 | Burdick | |
| 5,535,517 A | 7/1996 | Rode | |
| 5,573,311 A | 11/1996 | Clohessy | |
| 5,597,058 A | 1/1997 | Ewer | |
| 5,749,386 A | 5/1998 | Samuel, Jr. | |
| 5,877,433 A | 2/1999 | Matsuzaki et al. | |
| 5,882,044 A | 3/1999 | Sloane | |
| 5,934,853 A | 8/1999 | Junkers | |
| 6,042,273 A | 3/2000 | Thrasher | |
| 6,058,767 A | 5/2000 | Calvin | |
| 6,065,920 A | 5/2000 | Becker et al. | |
| 6,095,735 A | 8/2000 | Weinstein et al. | |
| 6,135,642 A | 10/2000 | Burch | |
| 6,186,032 B1 | 2/2001 | Raines | |
| 6,286,374 B1 | 9/2001 | Kudo et al. | |
| 6,520,710 B2 | 2/2003 | Wells | |
| 6,598,500 B1 | 7/2003 | Chivington-Wells | |
| 6,601,503 B2 | 8/2003 | Scholzig et al. | |
| 6,622,397 B1 | 9/2003 | Knoble | |
| 6,637,297 B1 | 10/2003 | Mlynarczyk | |
| 6,665,919 B1 * | 12/2003 | Kurtz | B25B 27/023 269/3 |
| 6,749,386 B2 | 6/2004 | Harris | |
| 6,857,665 B2 | 2/2005 | Vyse et al. | |
| 6,886,227 B1 | 5/2005 | Hedrick | |
| 6,971,802 B2 | 12/2005 | Vezina | |
| 6,976,817 B1 | 12/2005 | Grainger | |
| 6,988,832 B2 | 1/2006 | Dewachter | |
| 6,993,852 B2 | 2/2006 | Russell et al. | |
| 7,303,367 B2 | 12/2007 | Rode | |
| 7,343,836 B1 | 3/2008 | Ward | |
| 7,346,985 B1 | 3/2008 | Strait | |
| 7,389,579 B2 | 6/2008 | Rode | |
| 7,428,779 B2 | 9/2008 | Smith et al. | |
| 7,559,135 B2 | 7/2009 | Rode | |
| 7,625,164 B2 | 12/2009 | Rode | |
| 7,927,052 B1 | 4/2011 | Varden | |
| 8,006,573 B1 | 8/2011 | Rode | |
| 8,316,530 B2 | 11/2012 | Rode | |
| 8,328,486 B2 | 12/2012 | Cox | |
| 8,650,757 B2 | 2/2014 | Rode | |
| 8,739,377 B2 * | 6/2014 | Shen | B25B 27/0028 29/260 |
| 8,904,646 B2 | 12/2014 | Rode | |
| 8,961,090 B2 | 2/2015 | Rode | |
| 9,217,461 B2 | 12/2015 | Rode | |
| 9,566,699 B1 | 2/2017 | Rode et al. | |
| 9,599,164 B1 | 3/2017 | Rode et al. | |
| 9,764,453 B1 | 9/2017 | Rode et al. | |
| 9,908,223 B2 | 3/2018 | Rode et al. | |
| 2002/0110414 A1 | 8/2002 | Wells | |
| 2003/0035699 A1 | 2/2003 | Harris | |
| 2004/0086354 A1 | 5/2004 | Harris | |
| 2004/0089113 A1 | 5/2004 | Morgan | |
| 2005/0025604 A1 | 2/2005 | Slesinski | |
| 2005/0207865 A1 | 9/2005 | Disantis et al. | |
| 2006/0008340 A1 | 1/2006 | Cox | |
| 2009/0003963 A1 | 1/2009 | Winker et al. | |
| 2010/0326205 A1 | 12/2010 | Rode | |
| 2011/0097174 A1 | 4/2011 | Varden | |

FOREIGN PATENT DOCUMENTS

| | | |
|---|---|---|
| EP | 1367299 A2 | 12/2003 |
| GB | 990553 A | 4/1965 |
| GB | 2286231 A | 2/1995 |
| GB | 2435499 B | 8/2007 |
| GB | 2434621 B | 10/2008 |
| WO | 02/08618 A1 | 1/2002 |
| WO | 2008/003919 A1 | 1/2008 |
| WO | 2015/147903 A1 | 10/2015 |

OTHER PUBLICATIONS

"STEMCO Pro-Torq(R) 571-2970," Copyright 2005 STEMCO LP, 2 pages.

"Timkin Products—Bearings," vol. 1, Issue 6; 2 pages, [http://www.timken.com/products/bearings/techtips/tip6.asp].

Timkin Tech Tips: Promoting Safe, Proper Bearing Handling Practices for the Heavy-Duty Market; "Preload in Wheel Bearings" vol. 6, Issue 3, 2 pages, [http://www.Timkin.com/products/bearings/techtipsPDFs/Vol6No3.pdf#search='Bearing%20Preloa.

(56) References Cited

OTHER PUBLICATIONS

"Forming and Shaping Processes Compaction and Sintering (Pulvepresning)," Copyright Institut for Precesteknik Danmarks Tekniske Universitet 1996, (http://www.ipt.dtusdk/-ap/ingpro/forming/ppm/htm).

STEMCO, PRO-TORQ, An Axle Spindle Nut System for Today's Fleets. Mar. 2003; download from http://www.stemco.com, pp. 38-41.

STEMCO, PRO-TORQ, An Axle Spindle Nut System for Today's Fleets. Mar. 2003; download from http://www.stemco.com, pp. 57-64.

GB Intellectual Property Office Search Report Under Section 17, dated Aug. 25, 2010, from corresponding GB Application No. 1008927.4.

What is Powder Metallurgy? Dec. 2004, 2 pages. (https://www.mpif org/technology/whatis.html).

Stemco, Quick Reference Catalog 572-0011 Rev. Date Apr. 2010.

Stemco—Pro-Torq, Axle Spindle Nuts, An Axle Spindle Nut System for Today's Commercial Fleets (http://www.stemco.com/product/pro-torz-axle-spindle-nuts/.

Stemco—Pro-Torq Advanced Axle Spindle Nuts, Installation Procedure and Wheel Bearing Adjustment, 2 pages.

PCT/ISA/220—Notification of Transmittal of the International Search Report and the Written Opinion of the International Searching Authority, or the Declaration, dated Jul. 30, 2018, for corresponding PCT International Application No. PCT/US2018/026525.

PCT/ISA/210—International Search Report, dated Jul. 30, 2018, for corresponding PCT International Application No. PCT/US2018/026525.

PCT/ISA/237—Written Opinion of the International Searching Authority, dated Jul. 30, 2018, for corresponding PCT International Application No. PCT/US2018/026525.

\* cited by examiner

SYSTEMS AND METHODS FOR PRELOADING A BEARING AND INSTALLING A TAMPER INDICATING MEMBER

CROSS-REFERENCE TO RELATED APPLICATION

This application is a Continuation of U.S. Divisional patent application Ser. No. 15/399,473 filed on Jan. 5, 2017 titled "Systems and Methods for Preloading a Bearing and Installing a Tamper Indicating Member", which is a Divisional of U.S. Ser. No. 15/399,473, filed on Jan. 5, 2017, titled "Systems and Methods for Preloading a Bearing and Installing a Tamper Indicating Member" now U.S. Pat. No. 9,566,699 issued on Feb. 14, 2017, the entire disclosures of which are incorporated herein by reference.

This application relates to U.S. Ser. No. 14/455,143 filed on Aug. 8, 2014, titled "Systems And Methods For Preloading A Bearing And Aligning A Lock Nut", now U.S. Pat. No. 9,217,461 issued on Dec. 22, 2015, which claims priority to U.S. Provisional Patent Application Ser. No. 61/970,795, filed on Mar. 26, 2014, titled "Systems And Methods For Preloading A Bearing And Aligning A Lock Nut", the entire disclosures of which are incorporated herein by reference.

This application relates to U.S. Ser. No. 11/029,521, filed on Jan. 5, 2005, titled "Lock Nut System" now U.S. Pat. No. 7,303,367 issued Dec. 4, 2007, the entire disclosure of which is incorporated herein by reference.

This application relates to U.S. Ser. No. 11/738,041, filed on Apr. 20, 2007, titled "Lock Nut System" now U.S. Pat. No. 7,625,164 issued Dec. 1, 2009, the entire disclosure of which is incorporated herein by reference.

This application relates to U.S. application Ser. No. 11/341,948, filed on Jan. 27, 2006, titled "Method And Apparatus For Preloading A Bearing," U.S. Pat. No. 7,559,135 issued Jul. 14, 2009, the entire disclosure of which is incorporated herein by reference.

This application relates to U.S. application Ser. No. 11/354,513, filed Feb. 15, 2006, and titled "Method, Apparatus, And Nut For Preloading A Bearing", issued as U.S. Pat. No. 7,389,579 on Jun. 24, 2008, the entire disclosure of which is incorporated herein by reference.

This application relates to U.S. application Ser. No. 12/492,826, filed Jun. 26, 2009, and titled "Systems And Methods For Preloading A Bearing And Aligning A Lock Nut", issued as U.S. Pat. No. 8,316,530 on Nov. 27, 2012, the entire disclosure of which is incorporated herein by reference.

This application relates to U.S. Divisional application Ser. No. 15/885,988, filed Feb. 1, 2018, titled "Systems And Methods For Preloading A Bearing And Aligning A Lock Nut", and U.S. application Ser. No. 15/071,570, filed Mar. 16, 2016, now U.S. Pat. No. 9,908,223 issued Mar. 6, 2018 and titled "Systems And Methods For Preloading A Bearing And Aligning A Lock Nut", the entire disclosure of which is incorporated herein by reference.

This application relates to U.S. Divisional application Ser. No. 15/416,683, filed Jan. 26, 2017, titled "Systems And Methods For Preloading A Bearing", and U.S. application Ser. No. 15/071,584, filed Mar. 16, 2016, now U.S. Pat. No. 9,599,164 issued Mar. 21, 2017 and titled "Systems And Methods For Preloading A Bearing", the entire disclosure of which is incorporated herein by reference.

This application relates to U.S. Design application Ser. No. 29/558,261, filed Mar. 16, 2016, and titled "Retaining Ring Pliers", the entire disclosure of which is incorporated herein by reference.

This application relates to U.S. application Ser. No. 15/071,753, filed Mar. 16, 2016, now U.S. Pat. No. 9,764,453 issued Sep. 19, 2017 and titled "Systems And Methods For Preloading A Bearing", the entire disclosure of which is incorporated herein by reference.

TECHNICAL FIELD

The present invention relates, generally, to methods and apparatus for preloading antifriction bearings in drive trains, particularly, to preloading and adjusting bearings while monitoring the preload being applied.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.003 inches (where this amount is the compressive deflection of the two bearings combined), which is often referred to as "a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new.

Lock nut systems are often utilized to retain a wheel or hub assembly, including axle bearings, on a shaft. Such lock nut systems may be connected to a shaft and inhibit rotation of a retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft.

It is important that teeth of a locking member engage teeth of the lock nut such that the locking member is positioned to allow it to engage a slot of the shaft. The nut must be aligned to allow such engagement by selective rotation of the nut to a particular position such that the teeth of the nut and the teeth of the locking member when engaged allow an engaging portion of the locking member to engage a slot of the shaft. Rotation of the nut may be performed during the preloading of a bearing and the degree of rotation allowed may depend on the amount of compressive force applied to a bearing or hub during the preloading of the bearing and the method of application of such force.

Once an adjustment has been made to axle bearings to maximize the life of such bearings it is important to maintain the adjustment made. Further, it is desirable to ascertain from a visual inspection whether the adjustment has been altered without the need for actual measurement of a bearing's preload. The ability to maintain a proper preload and to verify that no additional adjustment has been made allows an original equipment manufacturer (i.e., OEM), such as an auto manufacturer, to provide a warranty on bearing systems which have not been adjusted after they have left the factory.

Thus, a need exists for providing accurate and repeatable procedures and devices for providing and adjusting bearing preload and for adjusting lock nut systems configured to retain preloaded bearings.

SUMMARY OF THE INVENTION

The present invention provides, in a first aspect, an apparatus for use in connecting a cover member to a retaining member coupled to a nut mounted to a shaft includes a body portion, arms, and a plurality of pressing members. The arms extend from the body portion relative to the nut such that contacting portions of the arms contact a rear side of the nut to connect the body portion to the nut. The plurality of pressing members extend from the body portion and is alignable with the plurality of tabs of a cover member when the cover member is located between the body and the nut. The body portion includes a press mechanism configured to cause a first pressing member of the pressing members to contact a first tab of the cover member to deform the first tab toward a retaining member coupled to the nut mounted on the shaft.

The present invention provides, in a second aspect, a method for use in providing a load on a bearing mounted to a shaft includes engaging a keeper with a nut mounted on shaft to inhibit movement of the keeper relative to the nut. A retaining member connected to a keeper is engaged with the nut to hold the keeper engaged with the nut. Arms are extended from a body portion of a tool and relative to the nut mounted on the shaft such that contacting portions of the arms contact a rear side of the nut to connect the tool to the nut. A first pressing member of a plurality of pressing members of the tool is aligned with a first tab of a plurality of tabs of a tamper indicating member when the tamper indicating member is located between the body and the nut.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

In accordance with the principals of the present invention, system and methods for adjusting bearings mounted on a shaft and aligning lock nuts for retaining such bearings are provided.

Figure 1:
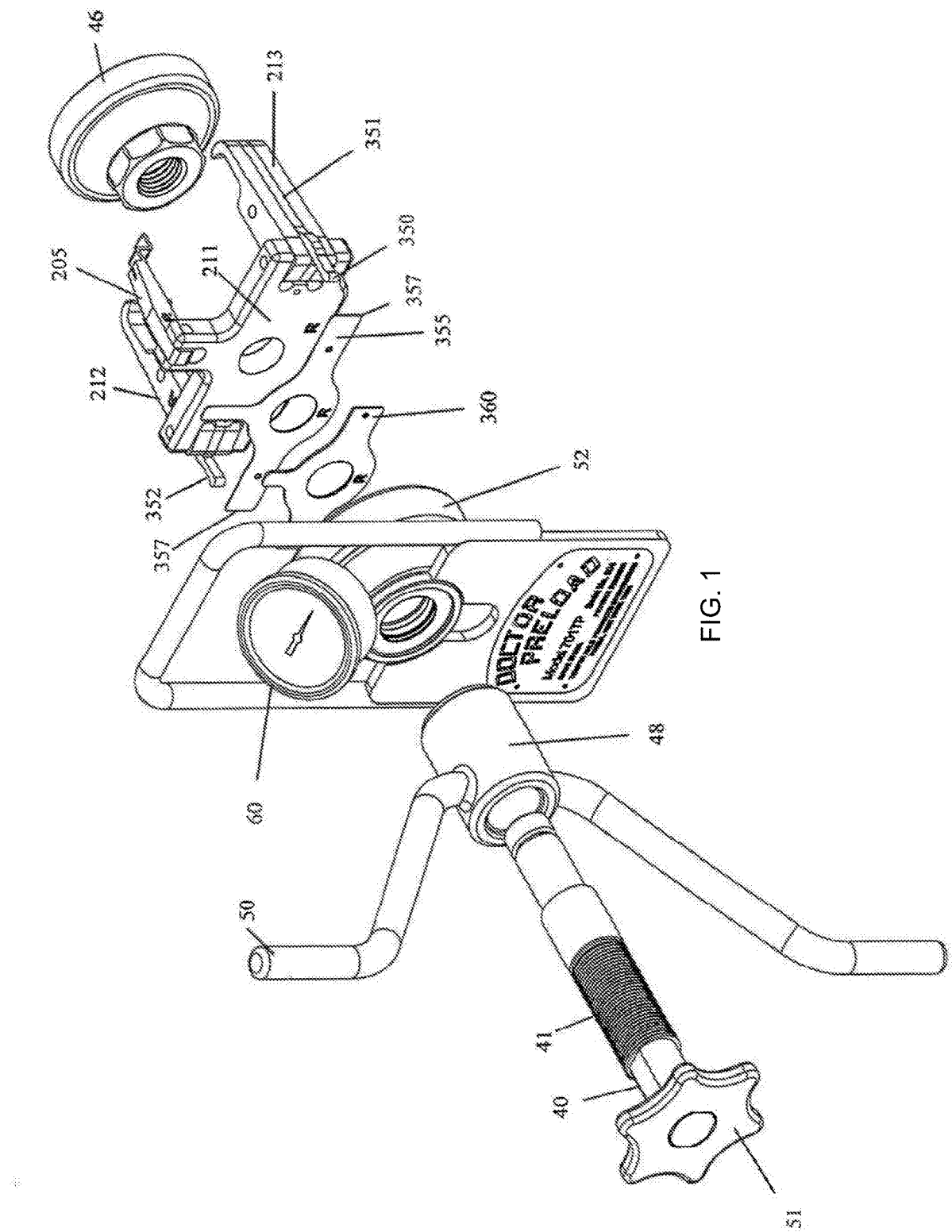
FIG. 1 is perspective exploded view of a wheel hub assembly engaging a bearing preload apparatus according to an aspect of the invention.
Figure 2:
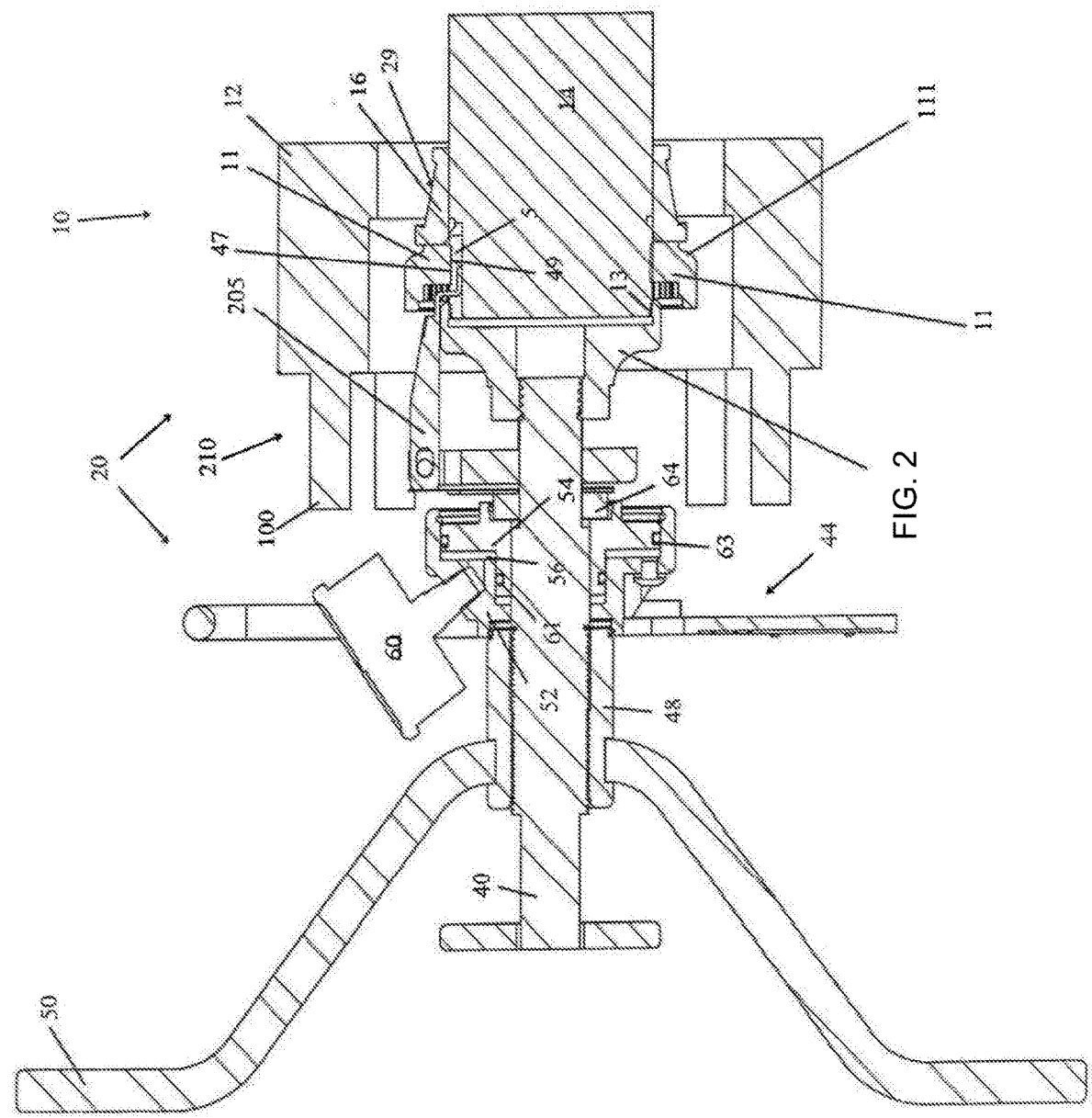
FIG. 2 is a right side elevation view, partially in cross section, of the assembly shown in FIG. 1.

In an exemplary embodiment depicted in FIGS. 1-2, a wheel hub assembly 10 engages a bearing preload apparatus 20, as disclosed in co-owned U.S. Pat. No. 8,316,530 issued on Nov. 27, 2012 titled "Systems And Methods For Preloading A Bearing And Aligning A Lock Nut", incorporated herein by reference. A section of the hardware has been removed to reveal inner structure to facilitate disclosure of the invention. For the sake of illustration, the wheel assembly that would typically be mounted to wheel hub assembly 10 is omitted in these figures.

Wheel hub assembly 10 is an assembly that would typically be found on a front or rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: power trains, transmissions, machine components, on and off-road vehicles, aircraft wheels, marine drives, spacecraft, conveyor rolls, and windmills, among others. According to aspects of the present invention, preload apparatus 20 may be used in these and any other assembly for which bearing preload and/or endplay is desired, for example, any assembly that utilizes thrust and radial load carrying bearings that are indirectly mounted.

As shown in FIGS. 1-2, for example, wheel hub assembly 10 includes a wheel hub or, simply, a hub 12, a threaded shaft, axle, or spindle 14. As is typical, spindle 14 is mounted on two antifriction bearings and spindle 14 includes an exposed end 13, which is typically threaded. Spindle 14 typically includes a retaining nut 11 threaded to exposed end 13.

As shown in FIGS. 1-2, as is typical of bearings, outboard bearing 16 includes an inner race (or cone) (not shown), an outer race (or cup) (not shown), a plurality of rollers (not shown), and a roller cage (not shown). Similarly, an inboard bearing (not shown) includes an inner race (or cone) (not shown), an outer race (or cup) (not shown), a plurality of rollers (not shown), and roller cage (not shown). As shown in FIG. 2, outboard bearing 16 is positioned, for example, by an interference fit, into an annular cavity 29. The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; U.S. Publication No. 2007/0177829A1, published Aug. 2, 2007, (application Ser. No. 11/341,948 filed Jan. 27, 2006), entitled "Method And Apparatus For Preloading A Bearing"; and U.S. Pat. No. 7,389,579, issued Jun. 24, 2008 (application Ser. No. 11/354,513, filed Feb. 15, 2006), entitled "Method, Apparatus, And Nut For Preloading A Bearing", the entirety of which are incorporated herein by reference.

As depicted in FIGS. 3, 4, 7, 9, and 10, for example, retaining nut 11 may be a locking nut as disclosed in co-owned U.S. Pat. No. 7,303,367 (application Ser. No. 11/029,531 filed Jan. 5, 2005), entitled "Lock Nut System"; U.S. Publication No. 2007/0177829A1 (application Ser. No. 11/341,948 filed Jan. 27, 2006), entitled "Method And Apparatus For Preloading A Bearing"; and U.S. Pat. No. 7,389,579 (application Ser. No. 11/354,513, filed Feb. 15, 2006), entitled "Method, Apparatus, And Nut For Preloading A Bearing". In the conventional art, retaining nut 11 typically is used to secure a wheel (not shown) or hub assembly to a non-rotating axle or spindle 14. However, in aspects of the present invention, retaining nut 11 may be useful in varying the preload and/or endplay of bearing 16. Though bearing 16 is illustrated as a tapered roller bearing, aspects of the invention may be applied to other types of antifriction bearings for which it is desirable to provide preload and/or endplay, for example, spherical roller bearings, deep groove ball bearings, and the like.

Figure 3:
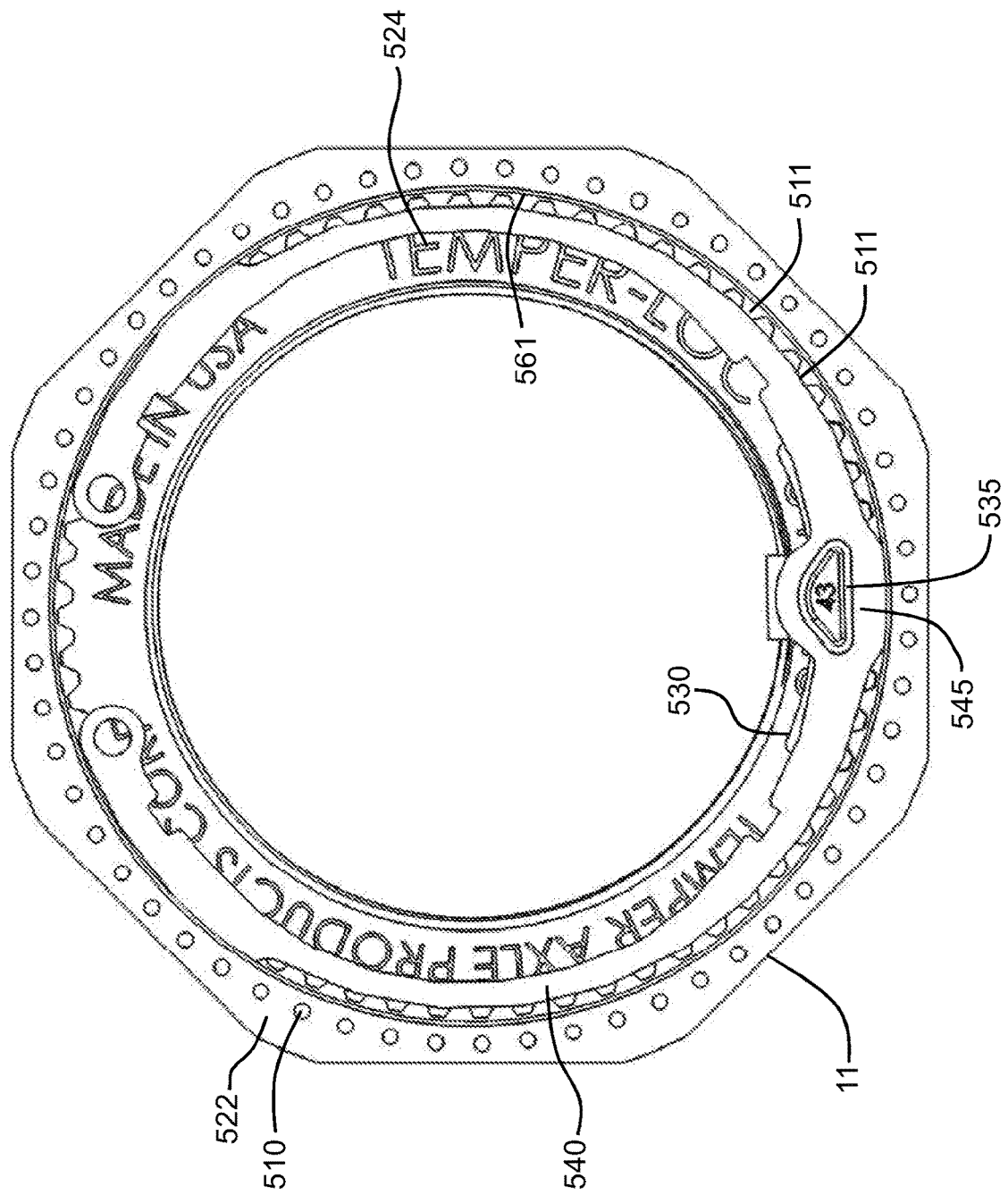
FIG. 3 is a top plan view of a lock nut system which includes a lock nut having a keeper and keeper retaining member engaged with the nut.

Nut 11 may include a plurality of engaging teeth 511 extending circumferentially around an inner radial surface of nut 11 as depicted in FIG. 3, for example. For example, nut 11 may include 60 engaging teeth. Nut 11 may also include a shoulder 524 configured to receive a keeper 530. For example, shoulder 524 may be spaced from an outer surface 522 of nut 11 in an axial direction relative to nut 11 such that an axial dimension of keeper 530 relative to nut 11 is received between outer surface 522 and shoulder 524. Shoulder 524 may also abut and support keeper 530 in an axial direction. Nut 11 may be molded or formed of powdered metal, for example.

Figure 4:
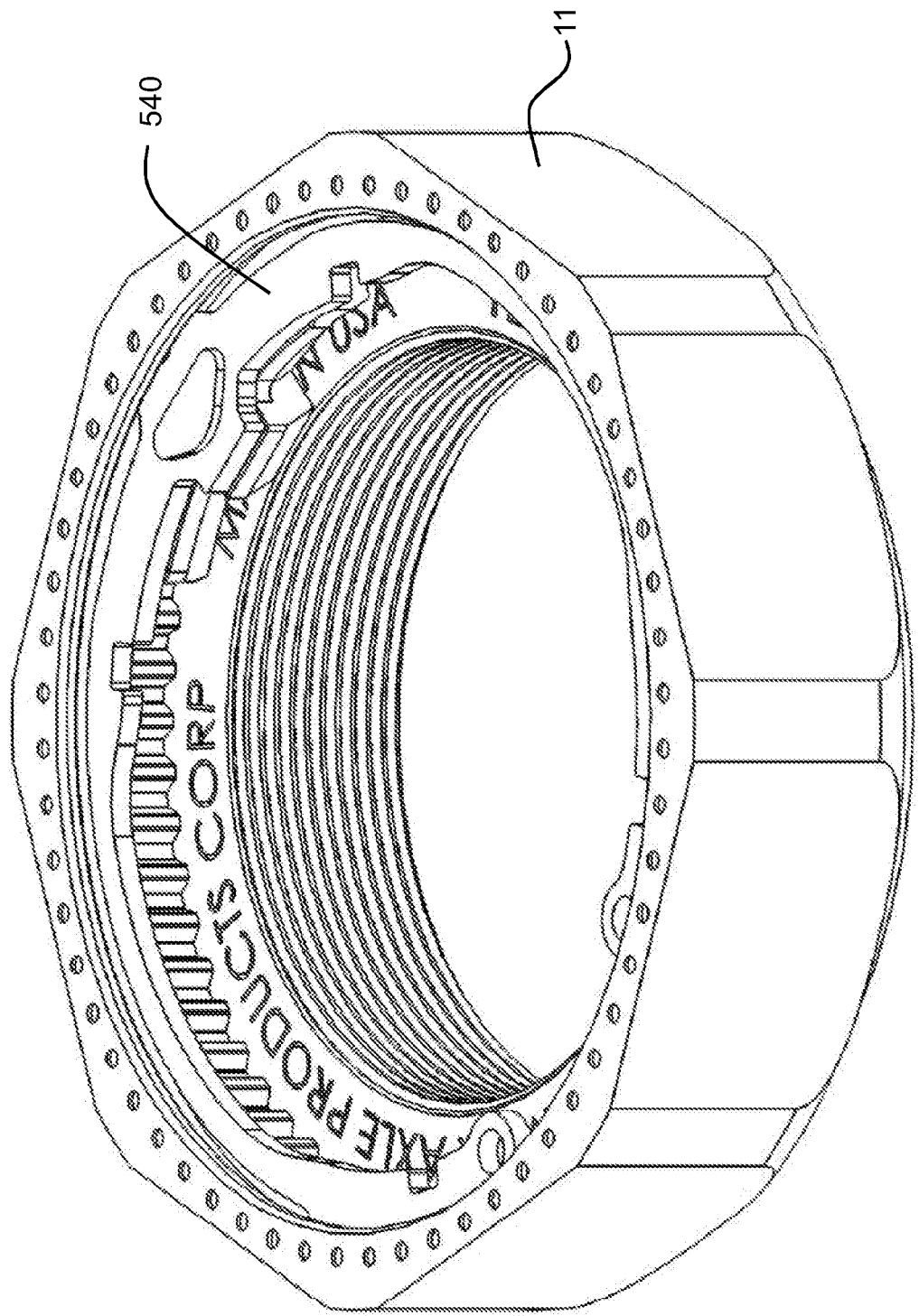
FIG. 4 is a perspective view of the system of FIG. 3.

As depicted in FIGS. 3 and 4, a keeper 530 is engageable with retaining nut 11 and is connected to a keeper retaining member 540. A projection 535 of keeper 530 extends through an opening 545 in retaining member 540 when connected, for example, as described in co-owned U.S. Ser. No. 14/455,143 filed on Aug. 8, 2014, titled "Systems And Methods For Preloading A Bearing And Aligning A Lock Nut". Keeper 530 and retaining member 540 engage retaining nut 11. For example, keeper 530 includes keeper teeth 520 which are configured to engage engaging teeth 511 of retaining nut 11. Keeper 530 may also include an engaging member 534 which protrudes radially inwardly relative to retaining nut 11 to engage a shaft slot 5 (FIG. 2), keyway, groove or other engaging portion of a shaft (e.g., spindle 14). Thus, engaging member 534 may inhibit movement of keeper 530 relative to a shaft (e.g., spindle 14) and the engagement of engaging teeth 511 with keeper teeth 520 may inhibit movement of keeper 530 relative to retaining nut 11. Accordingly, movement of retaining nut 11 relative to the shaft is prevented or reduced. Keeper 530 and/or nut 11 may be molded or formed of powdered metal, for example.

Keeper retaining member 540 (FIGS. 3-5) may engage a slot 561 of retaining nut 11. For example, slot 561 may extend circumferentially (e.g., completely or partially) around nut 11. Slot 60 may be located between engaging teeth 120 and outer surface 522 of nut 11. Also, slot 60 may have a radial depth of about 0.0 inches. A first leg 542 and a second leg 543 may be received in slot 561. For example, slot 561 may have a radial depth of about 0.050 inches. Further, a nose 544 of retaining member 540 may be received in slot 561. Retaining member 540 when received in slot 561 may align keeper 530 such that keeper teeth 520 are engaged with engaging teeth 511. Further, retaining member 540 provides resistance in an axial direction relative to retaining nut 11 thereby inhibiting movement of keeper 530 axially away from a shoulder 524 toward an outer surface 522. One example of such a tool is disclosed in co-owned U.S. Design application No. 29/558,261 filed Mar. 16, 2016 entitled "Systems And Methods For Preloading A Bearing".

Retaining member 540 (FIGS. 3-5) may be elastically deformable to allow it to be received in slot 561. For example, first leg 542 and second leg 543 may be deformed (e.g., in a direction substantially perpendicular to the axis of retaining nut 11) toward one another prior to being inserted axially past outer surface 522 of retaining nut 11 to allow retaining member 540, and keeper 530 to be attached thereto. First leg 542 and second leg 543 may then be elastically returned toward slot 561. A user may move the legs (i.e., first leg 542 and second leg 543) toward one another as described above to allow the retaining member to be received in slot 561. In one example, a user may use a tool (e.g., a tool made for this specific purpose or a type of pliers such as needle nose pliers) which is inserted into openings 611 and 612 (FIG. 5) to allow the tool to grip the legs to move ends 610 toward one another thereby allowing the legs to be inserted into slot 561.

Figure 5:
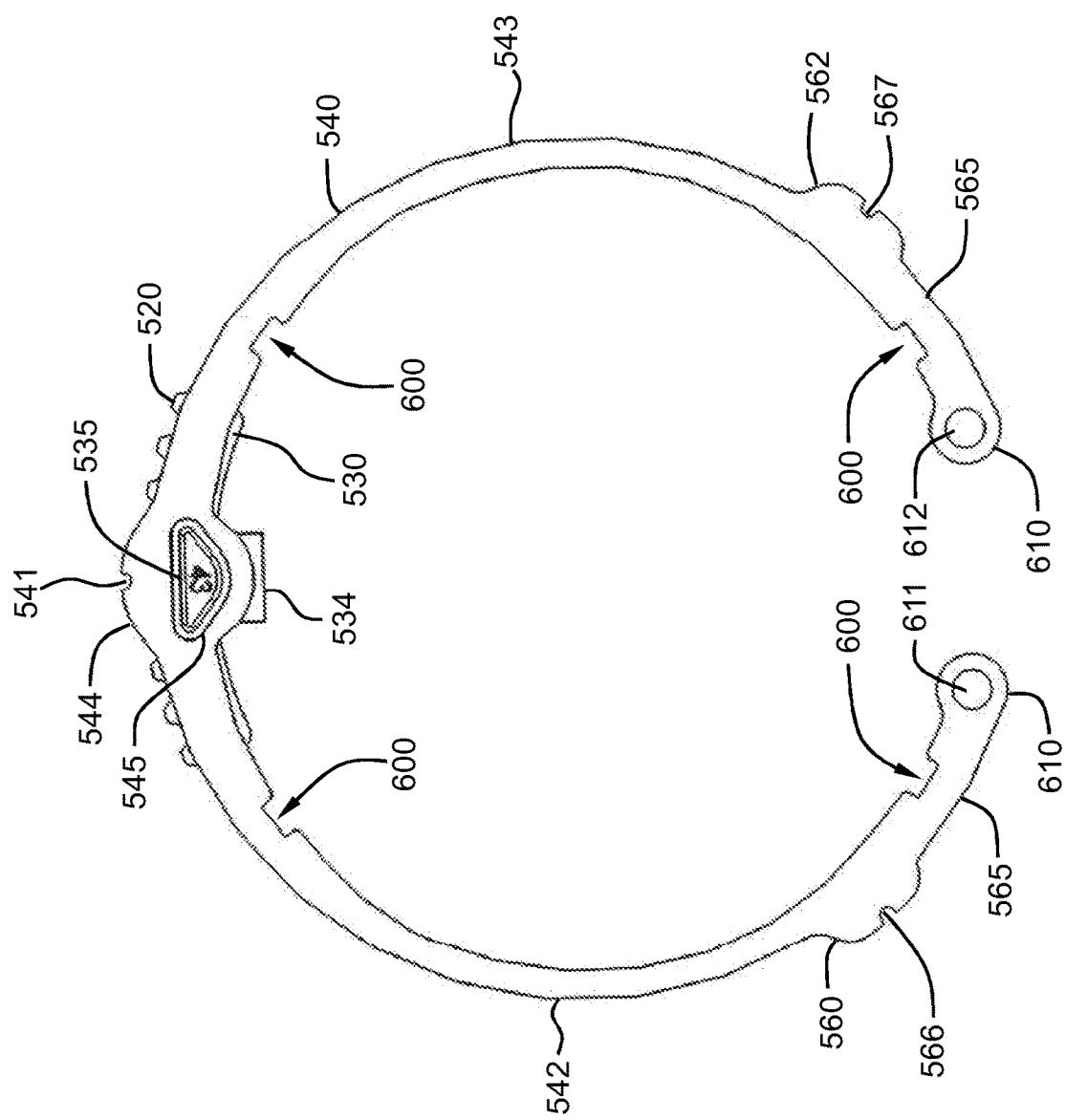
FIG. 5 is an elevational view of the keeper retaining member of FIG. 3.

Also, first leg 542 may include a protruding portion 560 which protrudes radially relative to a rounded portion 565 of retaining member 540. Similarly, second leg 543 may include a protruding portion 562. Protruding portion 560 and protruding portion 565 may extend into slot 561 to engage retaining member 540 with slot 561. Further, protruding portion 560 may include a groove 566 and protruding portion 562 may include a groove 567 as depicted in FIG. 5 for example.

A cover member (e.g., a tamper evident plate), such as a cover plate 750 (FIGS. 6-8), may be installed after retaining member 540 is engaged with nut 11 as described above, and the cover plate may inhibit access to the retaining member due to the connection between cover plate 750 and retaining member 540, such that any removal of the cover plate damages or deforms cover plate 750. Retaining member 540 may also include notches 600 on opposite sides of keeper 530 and spaced from ends 610 of retaining member 540 with the notches configured (e.g., shaped and dimensioned) to receive tabs 720 of cover member or cover plate 750 as depicted in FIGS. 5-8.

In particular, cover plate 750 is configured (e.g., shaped, dimensioned and formed of a material) such that a user could not remove the cover plate from the retaining member (and reinstall it) without it being evident upon a visual inspection that the system had been tampered with, i.e., the cover plate had been removed and reapplied. The damage to the cover plate would therefore provide an indication via visual inspection that retaining member 540 was accessed and nut 11 may have been adjusted, thereby adjusting a preload of the bearing. This indication of tampering (i.e., indication of damage to cover plate 750) allows a seller or manufacturer of wheel bearing systems, such as an OEM of vehicle or car parts, to provide a warranty on bearing systems utilizing the described cover plate since it would be evident upon visual inspection that a nut (e.g., nut 11) holding a wheel bearing may have been tampered with due to the condition of the cover plate. The cover member or cover plate 750 may be of a variety of shapes and sizes, but preferably covers at least a portion of a retaining member (e.g., retaining member 540).

Figure 6:
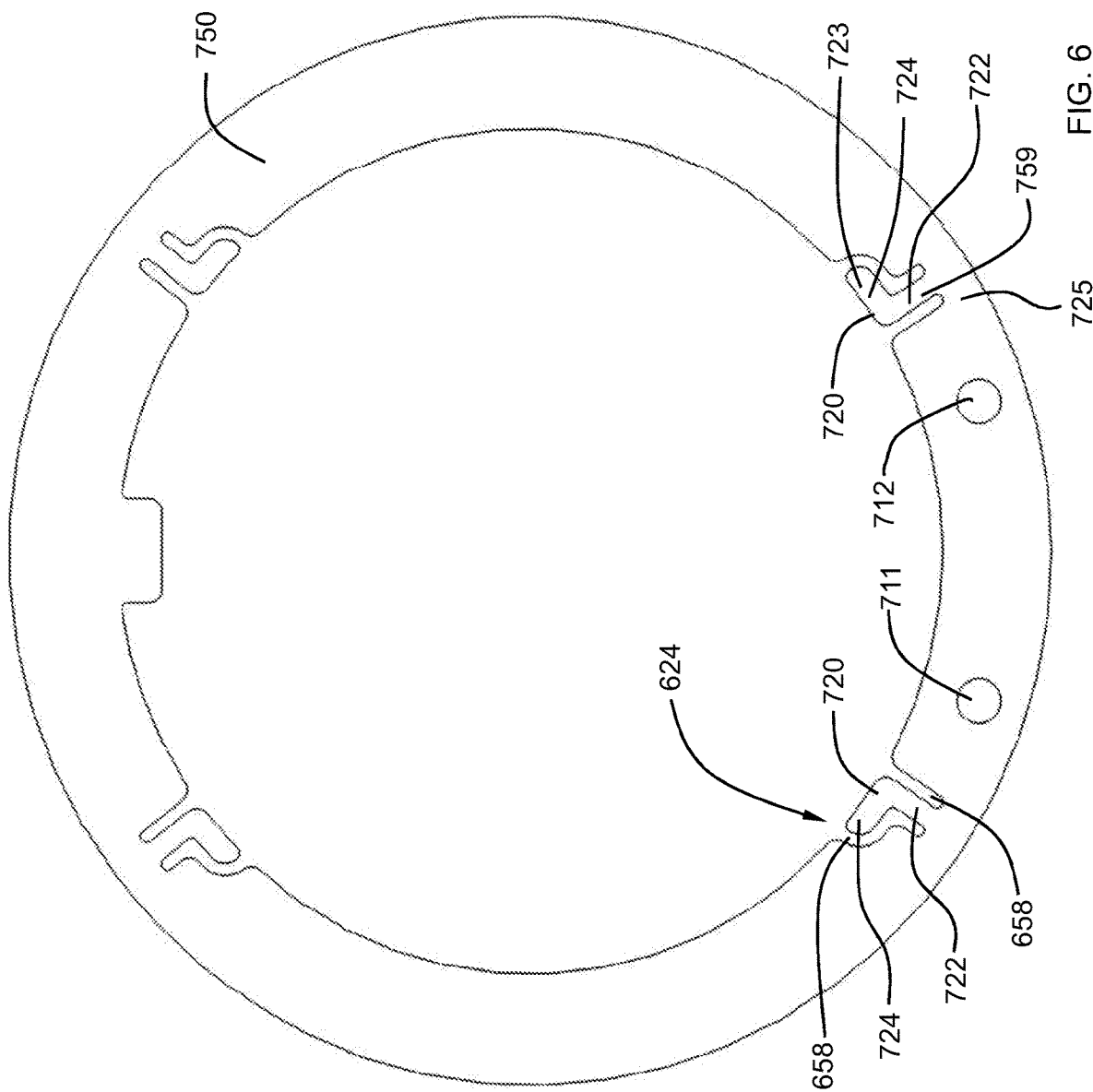
FIG. 6 depicts a front elevational view of a cover member usable with the retaining member, keeper and lock nut as depicted in FIG. 3.
Figure 7:
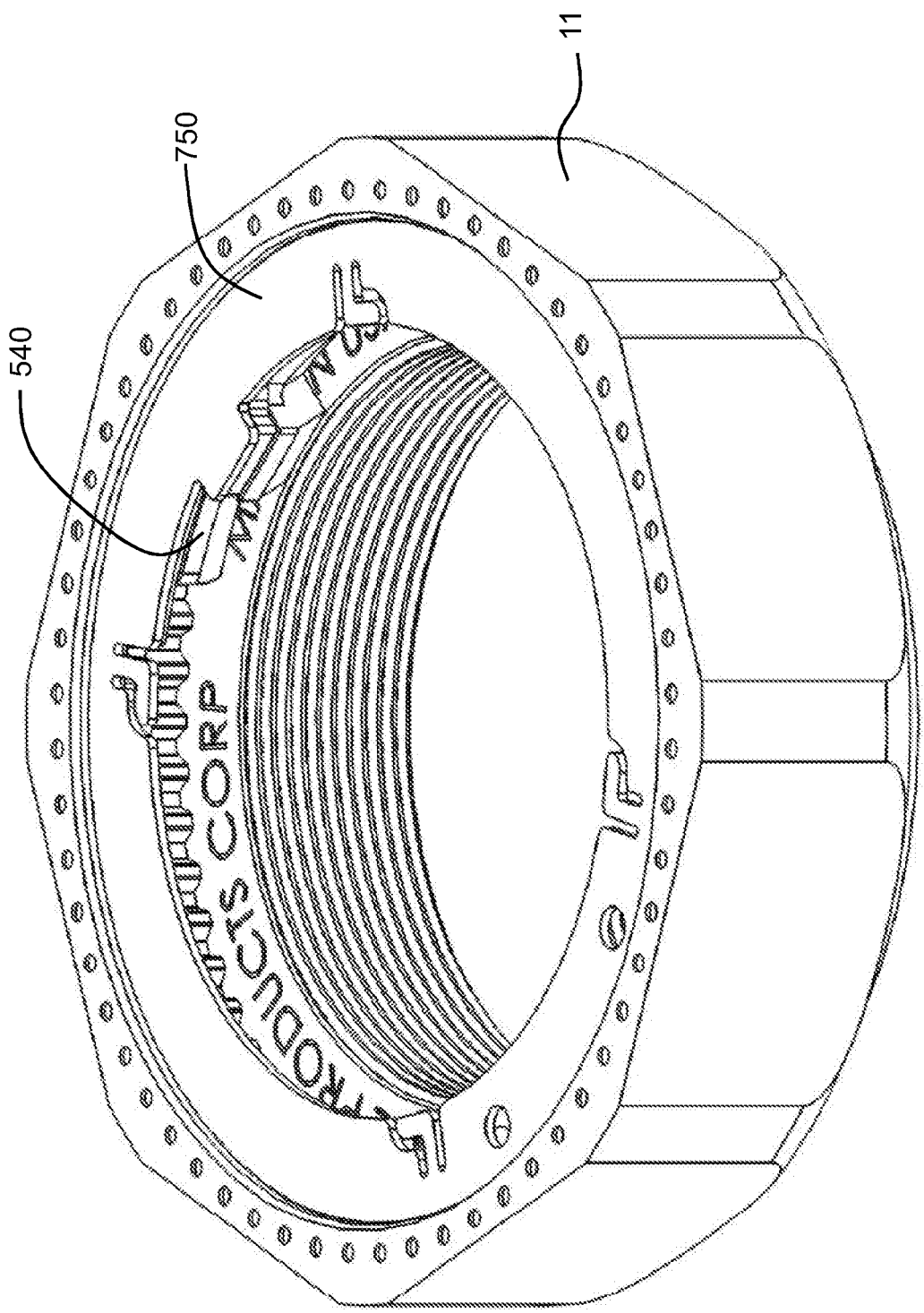
FIG. 7 is a perspective view of the lock nut system of FIG. 3 with the cover member of FIG. 6 located adjacent the keeper retaining member.
Figure 8:
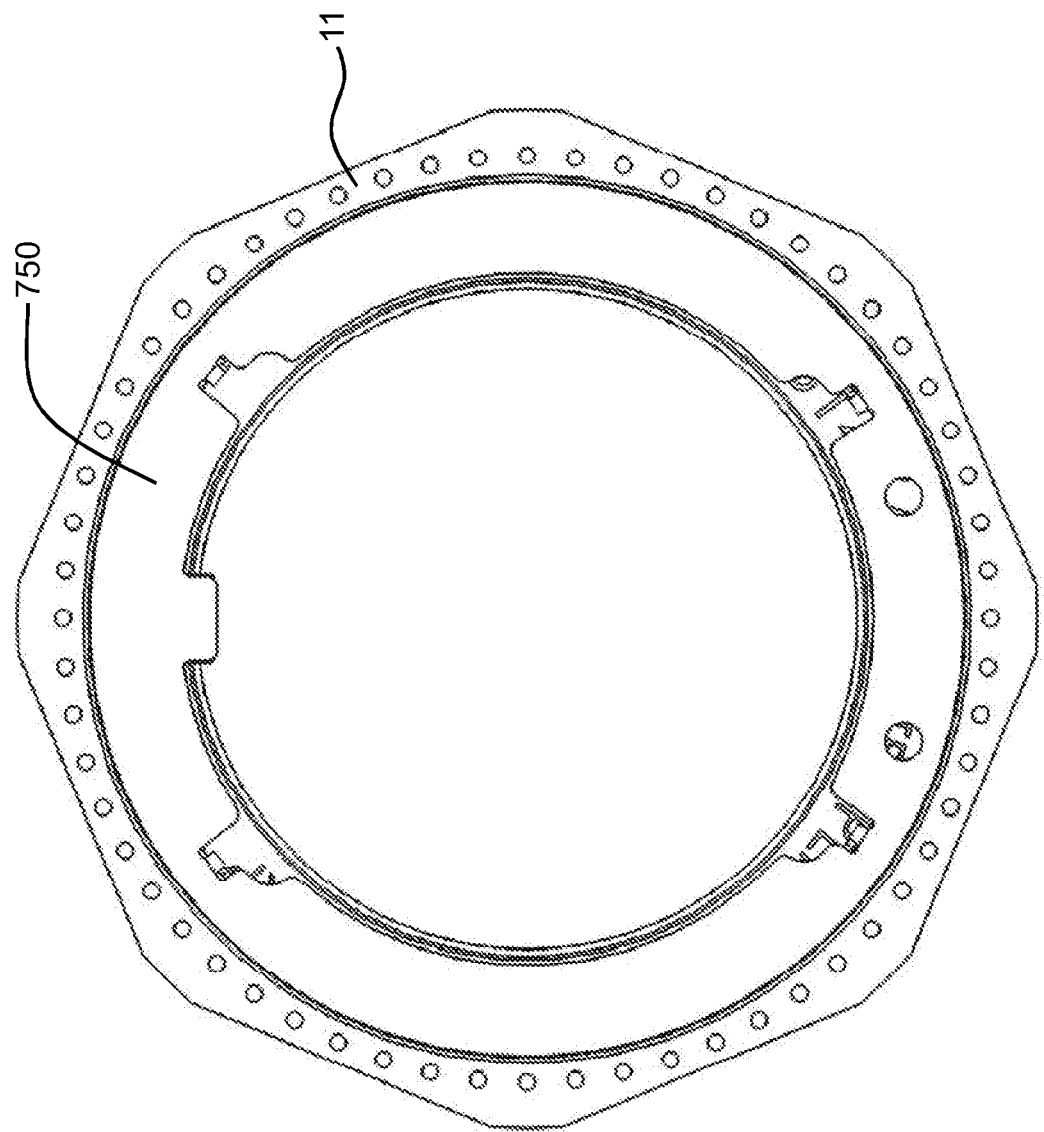
FIG. 8 depicts a top plan view of the lock nut system of FIG. 7 with tabs of the cover member connected the retaining member.
Figure 9:
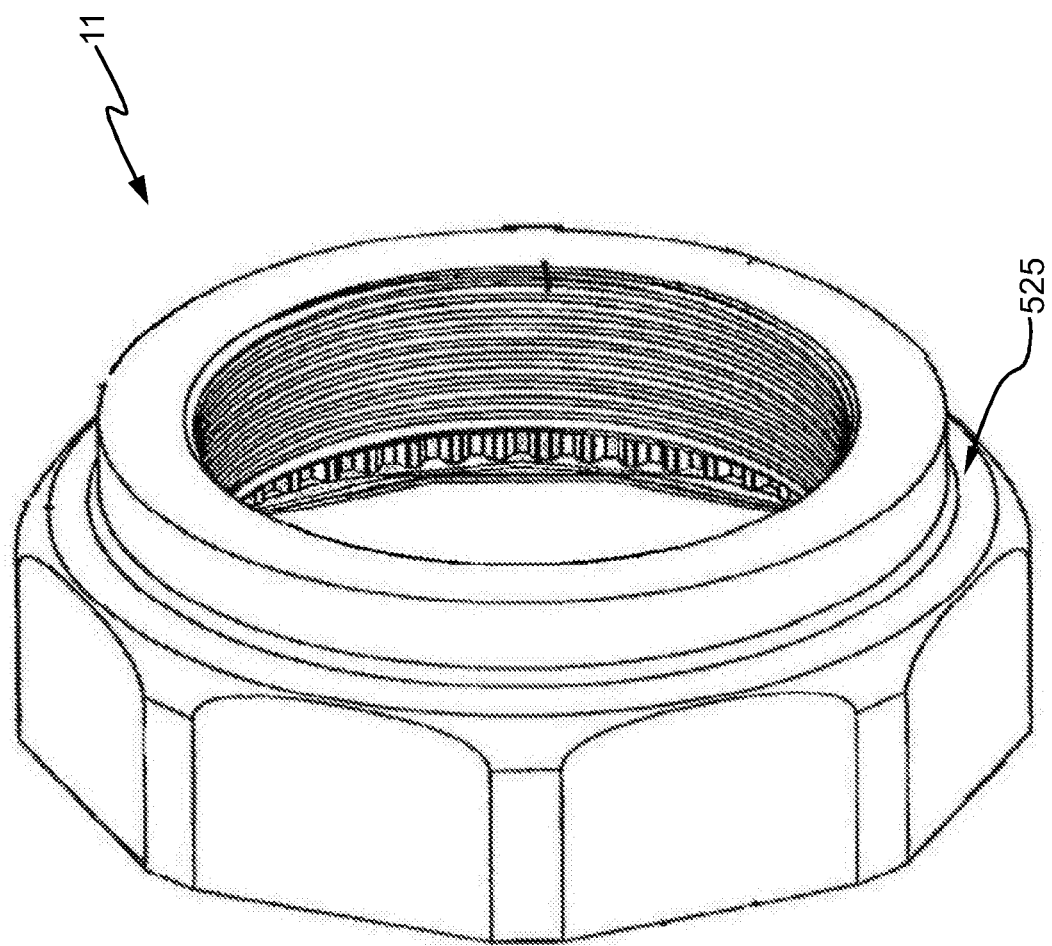
FIG. 9 is a perspective view of a retaining nut in accordance with an aspect of the present invention.

Tabs 720 of cover plate 750 may be L-shaped having radial extending portions 722 and circumferential portions 724 connected thereto, as depicted in FIGS. 6 and 7. Radial extending portions 722 may be connected to a remainder 725 of cover plate 750, and spaces 658 may separate radial extending portions 722 and circumferential portions 724 from remainder 725. Each of tabs 720 may be rotated toward nut 11 about one of points 759 connecting each of radial extending portions 722 to remainder 725. FIG. 8 depicts cover plate 750 and tabs 720 after the tabs are rotated about 90° toward nut 11.

Radial extending portions 722 (FIG. 6) may be received in notches 600 (FIG. 5) of retaining member 540 while circumferential extending portions 724 may be located on an opposite side of retaining member 540 relative to a remainder 656 of cover plate 750 such that ends 723 of circumferential extending portions 724 extend circumferentially outside notches 600 thereby inhibiting movement of the tabs through the notches in a direction away from nut 11. As described above, the extension of the circumferential portion outside the notch may inhibit separation of the retaining member from the cover plate (i.e., due to contact of circumferential extending portions 724 with retaining member 540) thereby providing a visible indication when such separation is attempted, and tabs 720 are thereby deformed or damaged.

Figure 11:
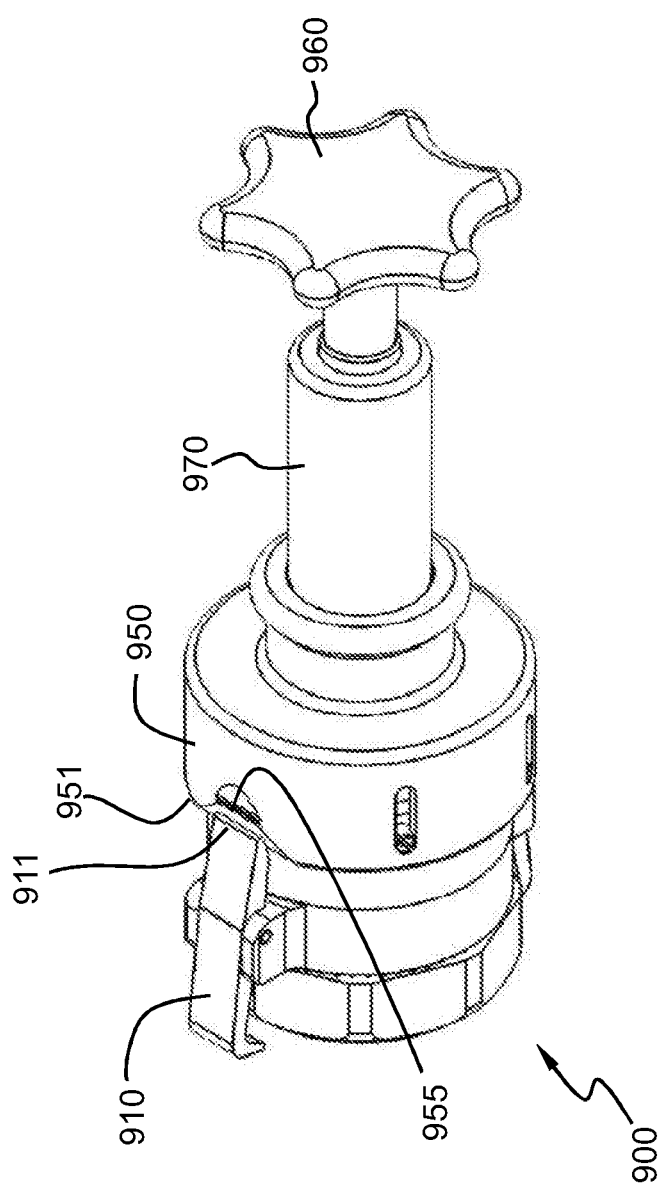
FIG. 11 is a perspective view of an installation tool in accordance with the present invention.
Figure 12:
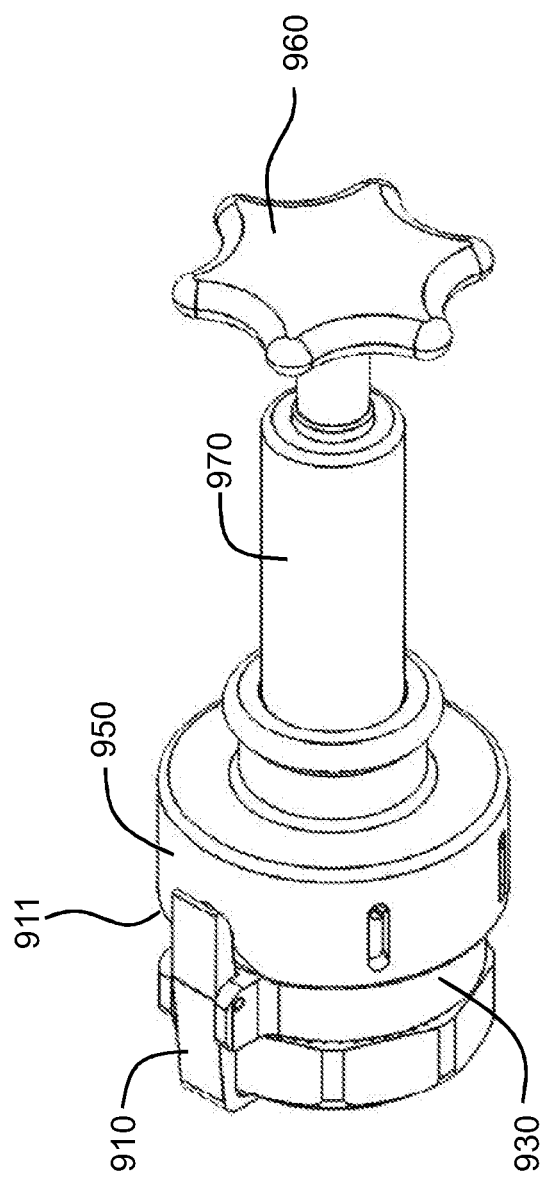
FIG. 12 is a perspective view of the tool of FIG. 11 with arms thereof closed to connect to a nut.
Figure 17:
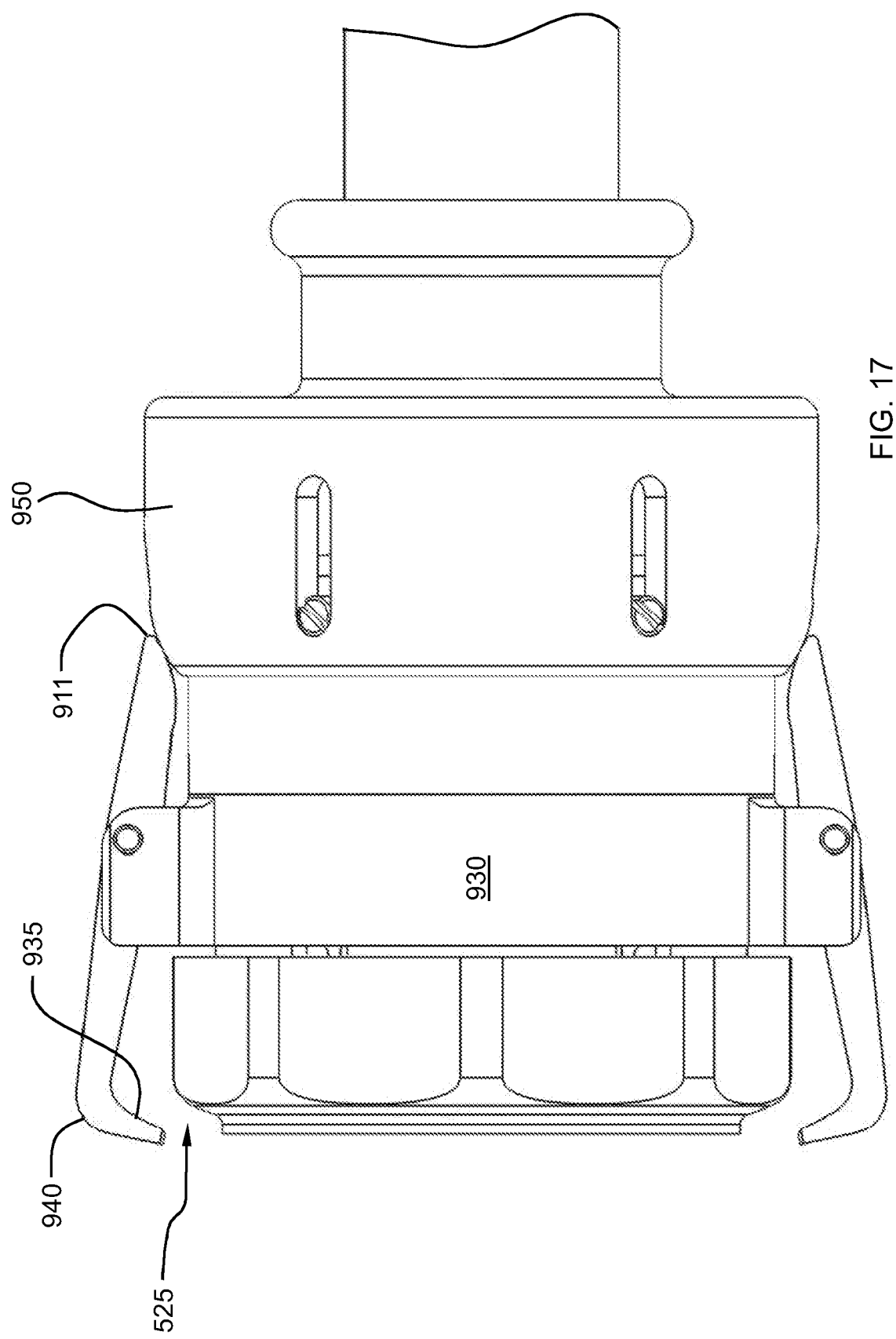
FIG. 17 is a close-up side elevational view of the tool of FIG. 11 shown adjacent to the nut of FIG. 10.
Figure 18:
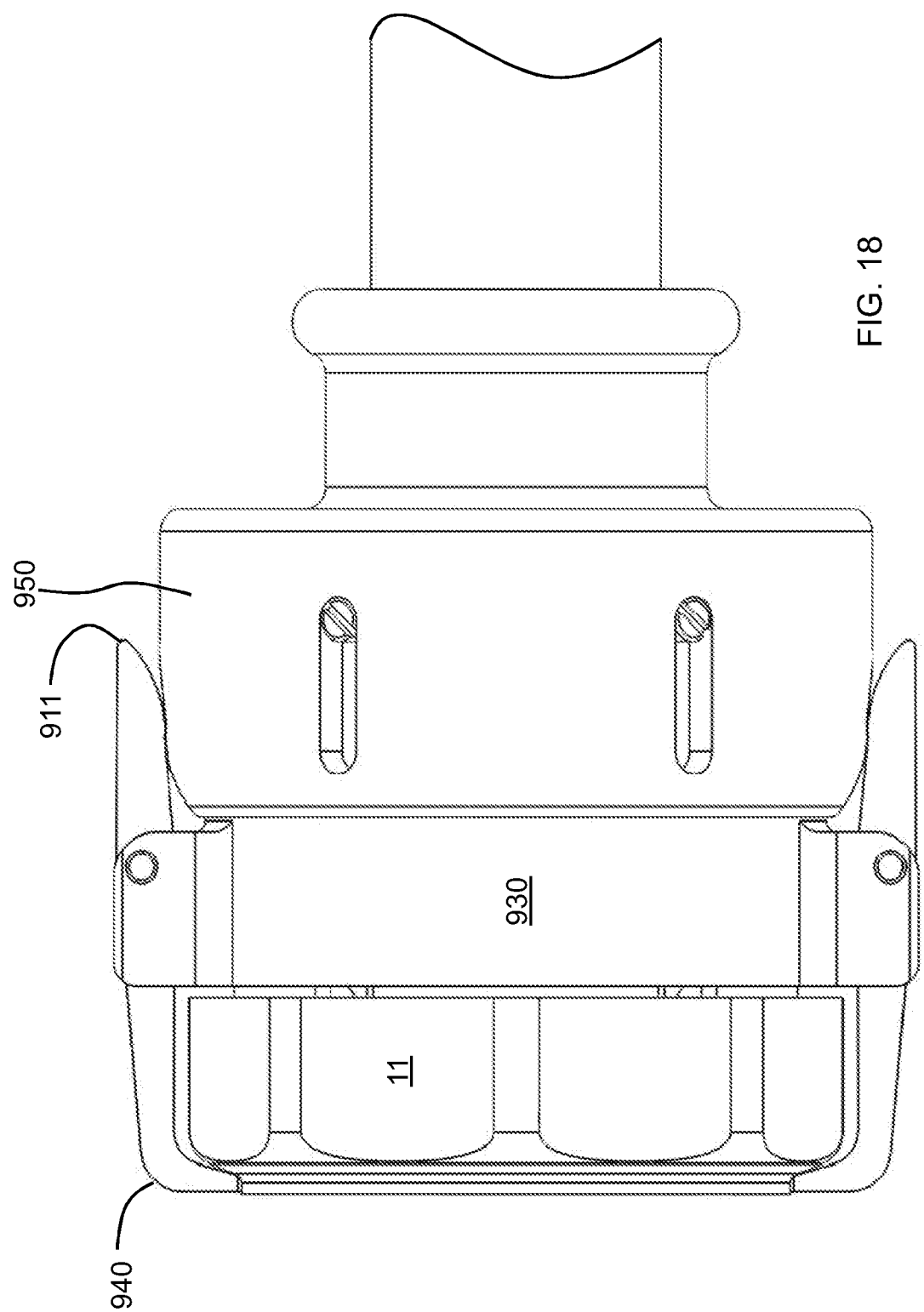
FIG. 18 is a side close-up elevational view of the tool of FIG. 17 with arms of the tool connected to the nut.

FIG. 11-20 depicts an installation tool 900 having arms 910 pivotable about pins 920 attached to a flange 925 of a body portion 930. Arms 910 may have projecting portions 940 with inner surfaces 935 curved to correspond to a curved surface 525 of nut 11 adjacent a second end 526 of nut 11 located at an opposite extent of nut 11 relative to outer surface 522. As depicted in FIGS. 12 and 18, arms 910 may connect to nut 11 via such arms engaging curved surface 525 adjacent second end 526.

Arms 910 may be biased by resilient members 945 (e.g., springs), such that the arms remain in an open position as depicted in FIGS. 11 and 17. As depicted in FIG. 12, a sleeve 950 co-axial to body portion 930 may be moved laterally toward nut 11 as compared to FIG. 11 such that an end 951 of sleeve 950 abuts a proximal end 911 of each of arms 910 to cause end 911 to move radially away from an axis of body portion 930 to cause inner surfaces 935 to engage curved surface 525 (FIG. 17). End 951 of sleeve 950 may include ramped recessed portions 955 and end 911 may include an inner curved portion 912 to facilitate engagement of end 911 and recessed portions 955 to allow movement of end 911 gradually radially outwardly and thus projecting portions 940 radially inwardly to engage nut 11 as depicted in FIGS. 12 and 18. Also, FIGS. 13-16 depict arms 910 in a closed, engaging position without nut 11 being present.

As indicated above, arms 910 may be biased in an open position, and as depicted in FIGS. 11 and 17 tool 900 may be located to be coupled to nut 11 such that arms 900 laterally bypass nut 11 until sleeve 950 is moved axially relative to a remainder (e.g., body portion 930) of tool 900 to move arms 910 to engage projections 940 with curved surface 525 to connect tool 900 to nut 11.

Figure 21:
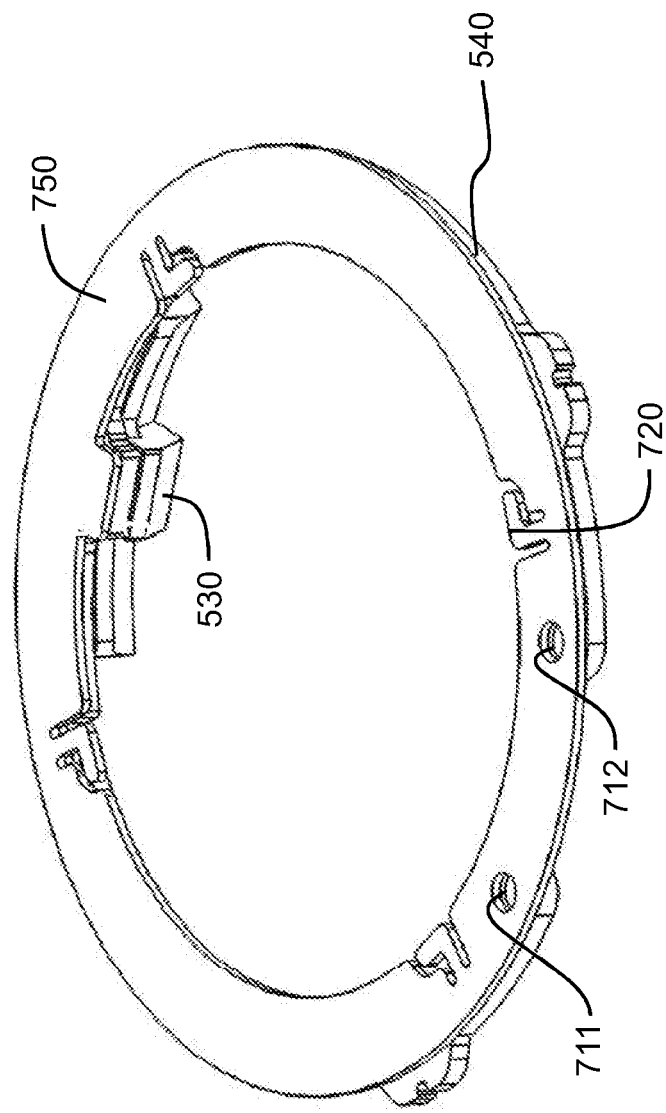
FIG. 21 is a perspective view of the cover member and retaining member of FIG. 7 contacting each other and aligned circumferentially.

Prior to connecting tool 900 to nut 11, cover plate 750 may be coupled to tool 900 via aligning posts 1110 (FIG. 13) extending from body portion 930, for example. In particular, posts 1110 may be received in openings 711 and 712 of cover plate 750 (FIG. 6) prior to an engagement of tool 900 with nut 11. Posts 1110 may be configured (e.g., spaced, dimensioned and shaped) to extend through openings 711 and 712 of cover plate 750 and openings 611 and 612 of retaining member 540 (FIG. 5) when tool 900 is connected to nut 11. FIG. 21 depicts cover plate 750 contacting retaining member 540 and aligned circumferentially such that openings 611 and 612 of retaining member 540 are aligned with openings 711 and 712 of cover plater 750 in the same manner as if posts 1110 were received in the openings with nut 11 and tool 900 omitted for ease of illustration.

Figure 22:
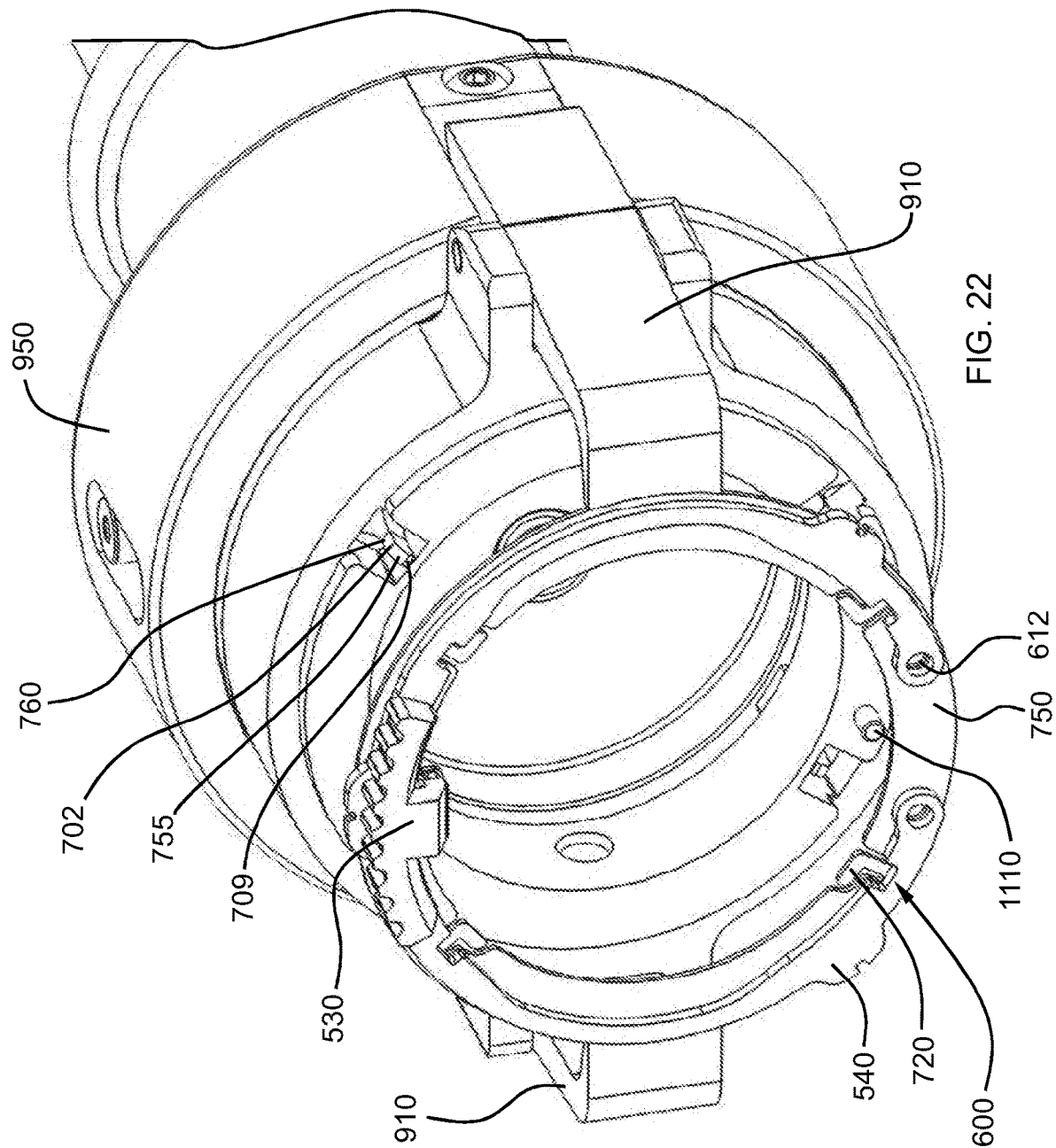
FIG. 22 is a cross-sectional view of an end of the tool FIG. 11 along with the retaining member and cover member of FIG. 7 prior to engagement of the tool therewith.
Figure 23:
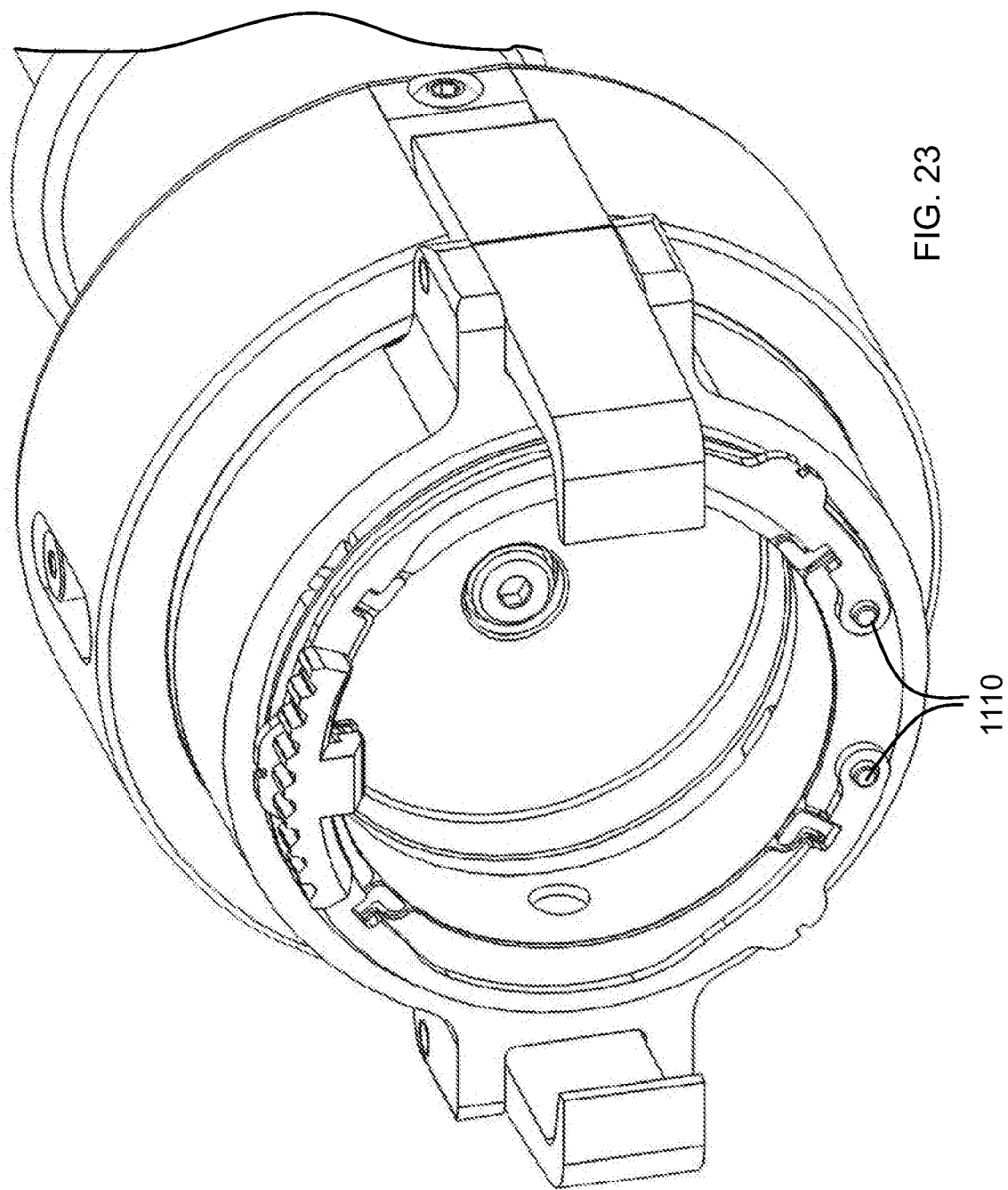
FIG. 23 depicts the tool, retaining member and cover member of FIG. 22 with the tool engaged therewith.

FIG. 22 depicts an underside of retaining member 540 and cover plate 750 adjacent installation tool 900 with coverplate 750 contacting and aligned with retaining member 540 as in FIG. 21 prior to posts 1110 of tool 900 extending through openings 611 and 612 with nut 11 not shown for the purpose of clarity. As depicted, openings 711 and 712 are axially aligned with openings 611 and 612 and posts 1110 are aligned with openings 711 and 712 and openings 611 and 612. By receiving the posts in openings 711 and 712, legs 710 of tool 900 may be aligned with tabs 720 of cover plate 750 to allow the legs to contact and deform tabs 720 toward nut 11 to connect cover plate 750 to retaining member 540. FIG. 23 depicts posts 1110 received in openings 611 and 612 and openings 711 and 712. Arms 910 are in a closed, engaging position as in FIGS. 13-16 to connect nut 11 (not shown in FIG. 23) to tool 900.

Figure 13:
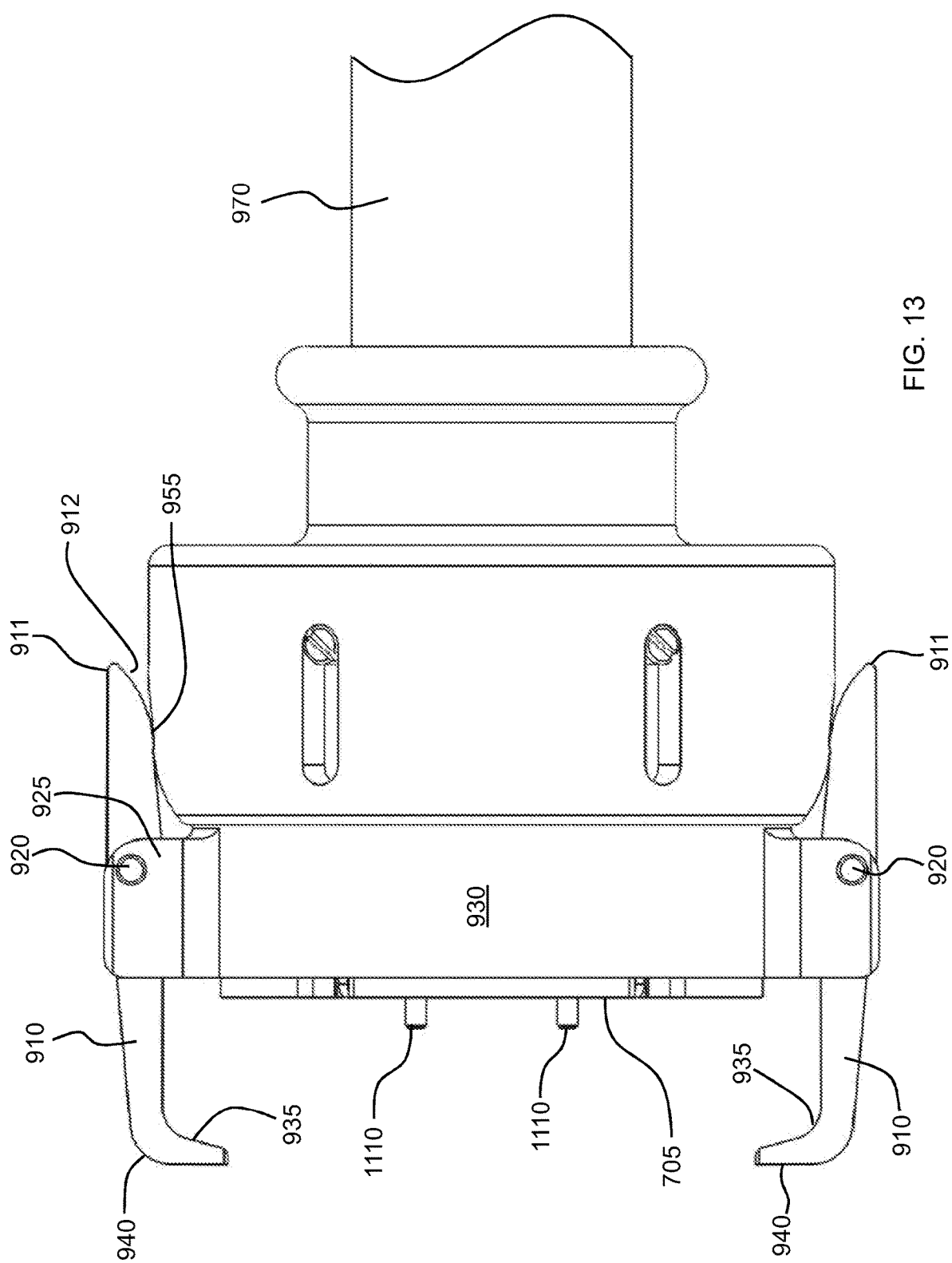
FIG. 13 is a close up side elevational view of a portion of the tool of FIG. 11.
Figure 14:
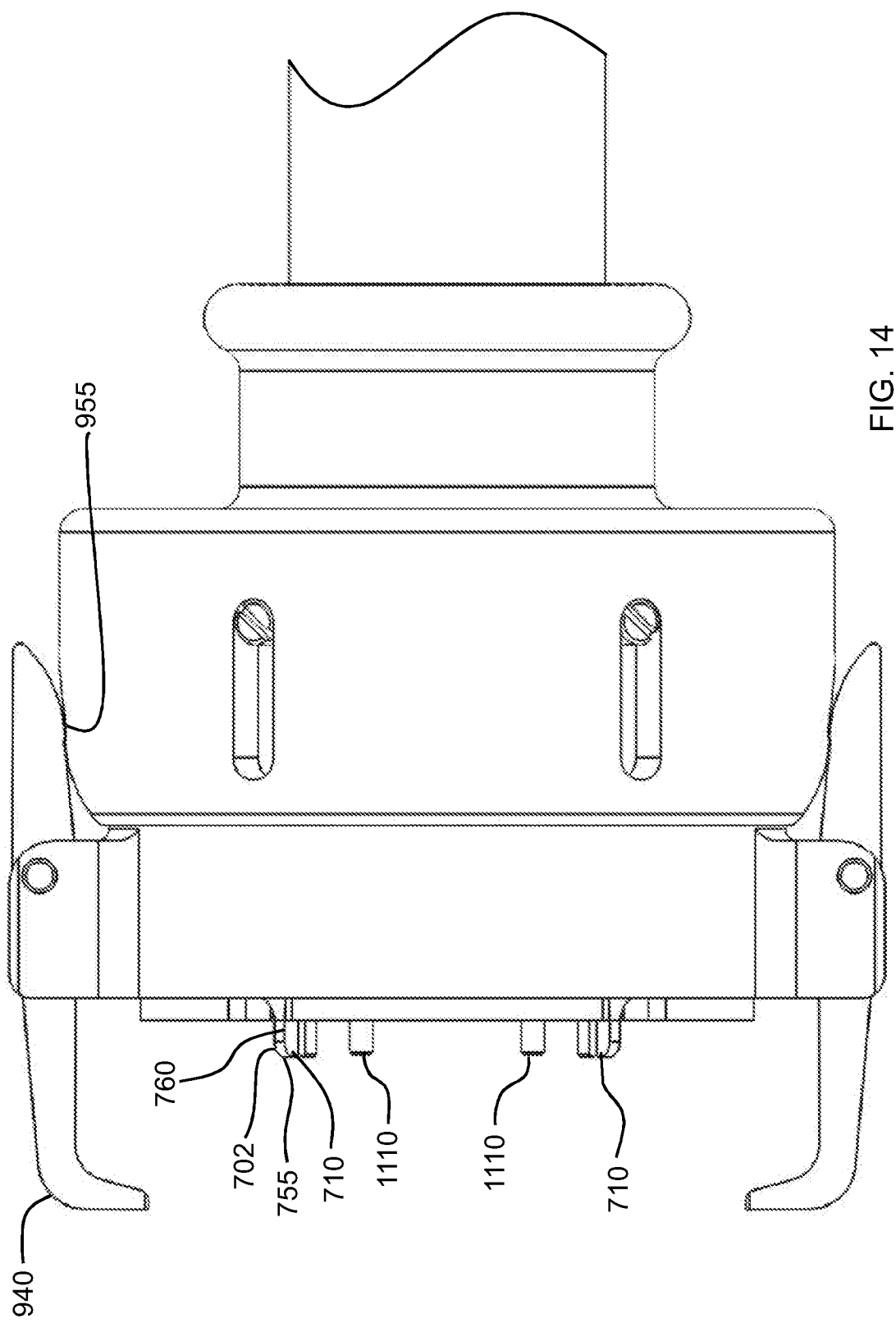
FIG. 14 is a side elevational view of the tool of FIG. 13 with legs extending therefrom.
Figure 15:
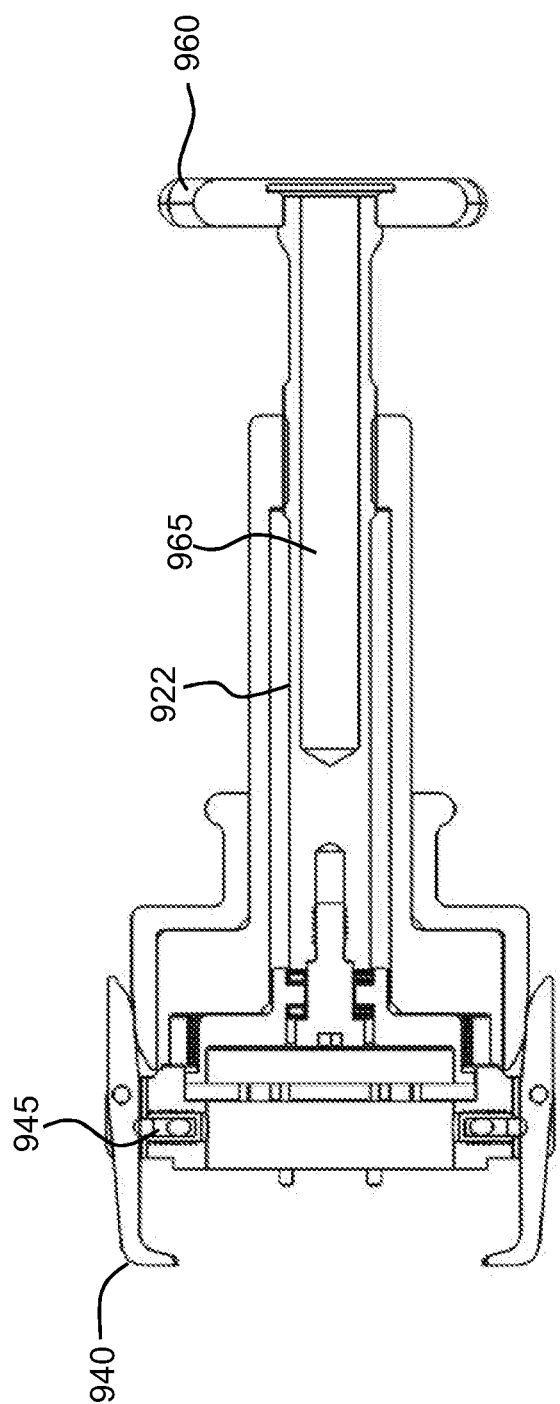
FIG. 15 is a side cross-sectional view of the tool of FIG. 11.
Figure 16:
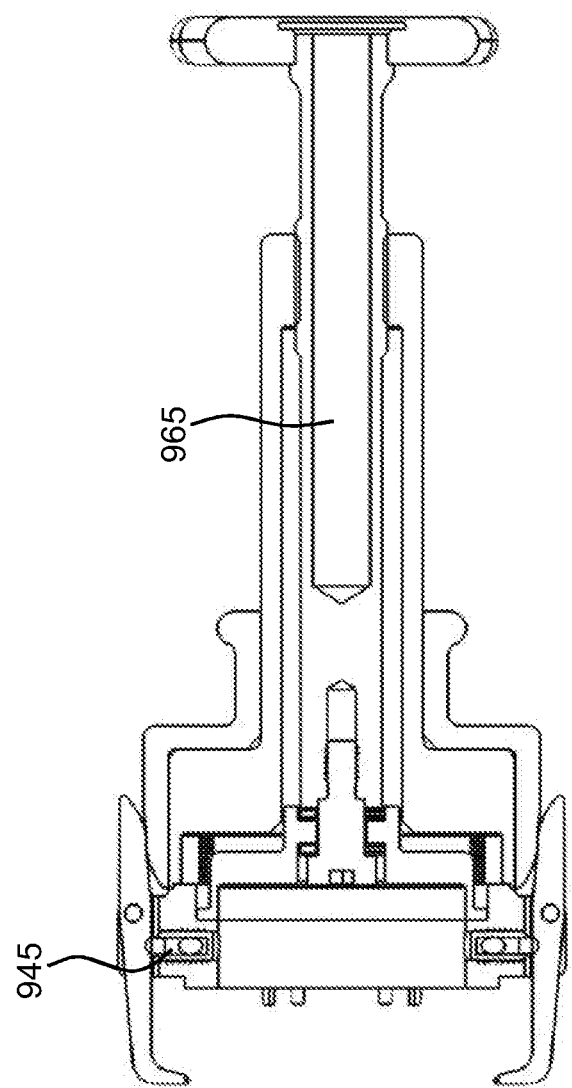
FIG. 16 is a side cross-sectional view of the tool of FIG. 15 with legs extending therefrom.
Figure 24:
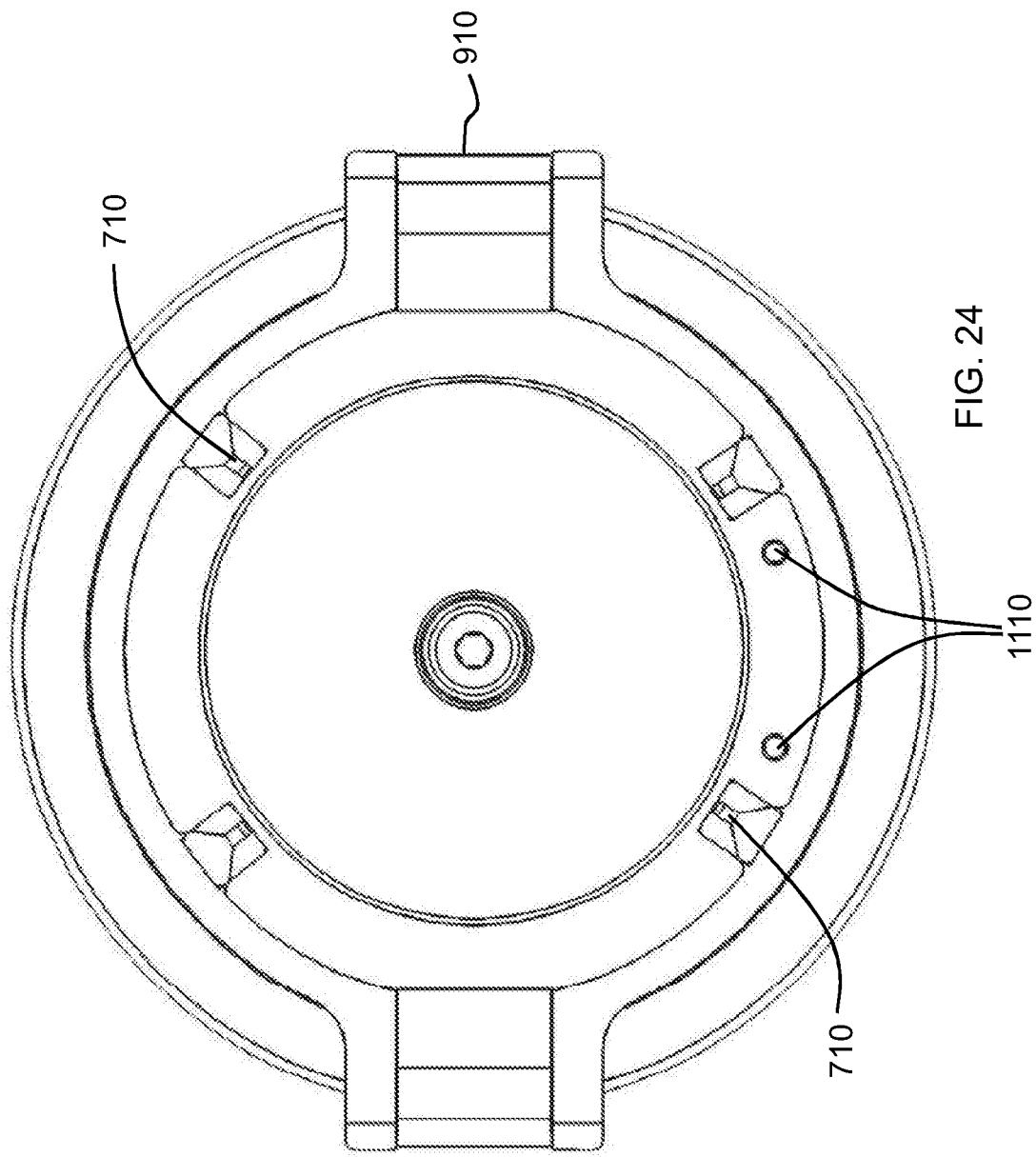
FIG. 24 is an end view of the tool of FIG. 11.

Legs 710 of installation tool 900 may be circumferentially spaced pressing members (e.g., four such members) extending axially from a circumferential base 705 of body portion 930, as depicted in FIGS. 13, 22 and 24, for example. Each leg 702 of legs 710 may include an axial member 760 having a curved portion 755 as depicted in FIG. 22, for example. Axial member 760 may extend axially outwardly from base 705 while curved portion 755 may extend from a lower side adjacent retaining member 540 to an upper side adjacent body portion 930 as depicted in FIG. 22, for example.

Figure 25:
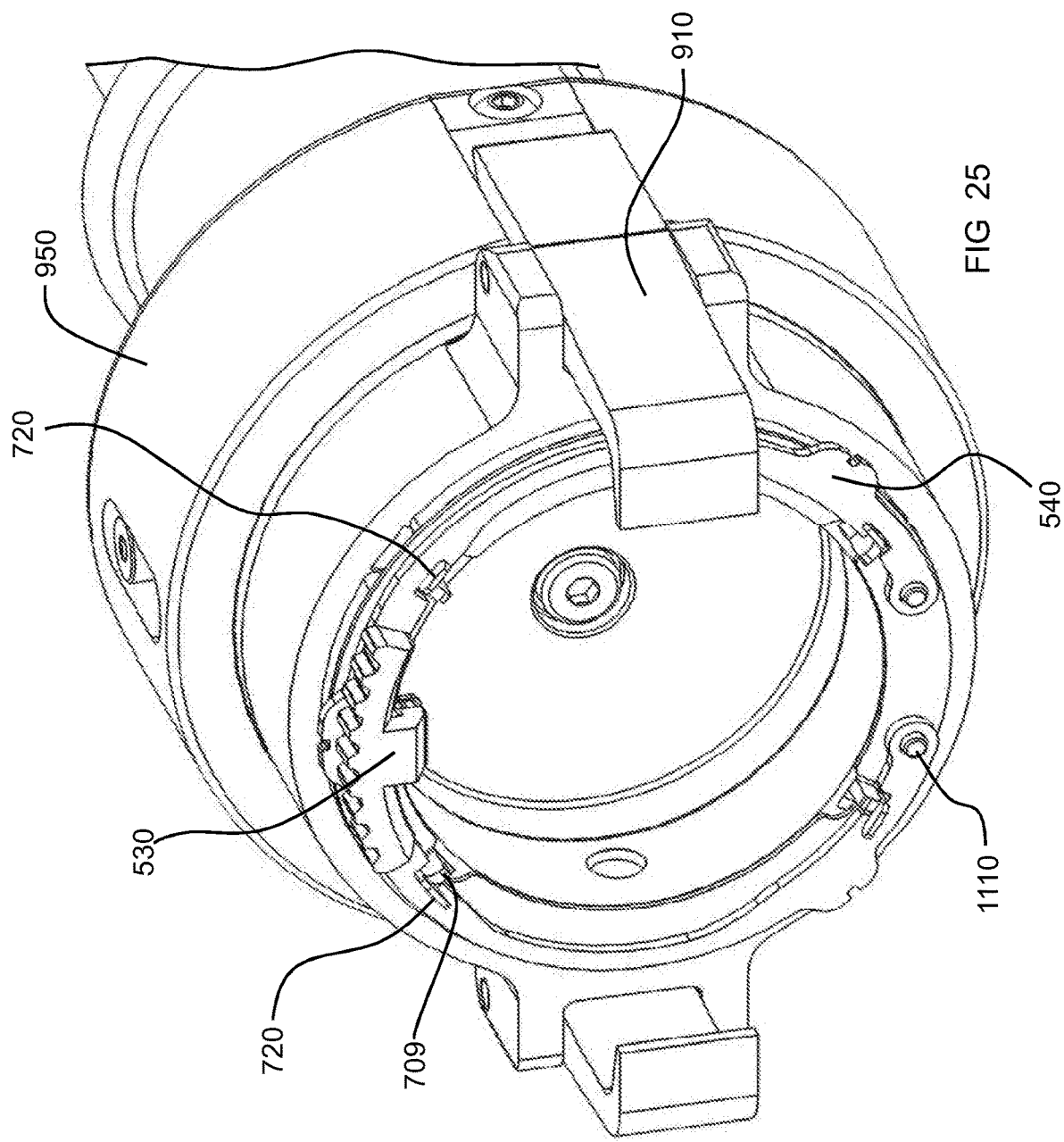
FIG. 25 is a perspective view of the tool, retaining member, and cover member of FIG. 23 after legs of the tool deform tabs of the cover member.

Axial member 760 may be configured (e.g., shaped and dimensioned) to be received in an opening 624 created in cover plate 650 and one of notches 600 of retaining member 540 when each leg 702 contacts each of tabs 720 to deform the tab toward the retaining member (e.g., retaining member 540) and toward a nut (e.g., nut 11) as depicted in FIG. 25, for example.

Figure 26:
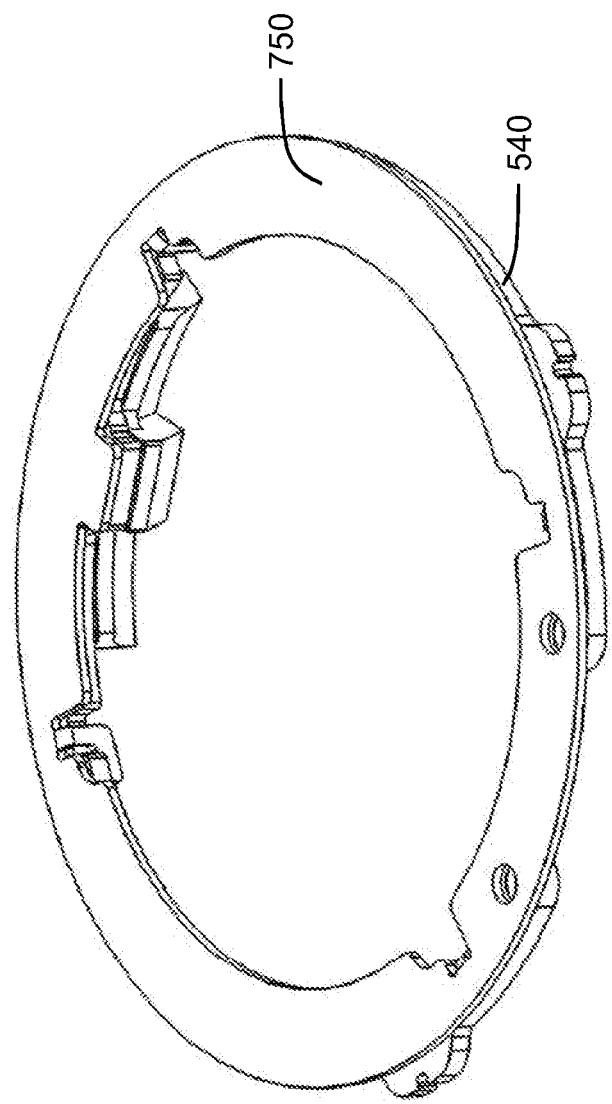
FIG. 26 depicts the cover member and retaining member of FIG. 25 with the tool emitted ease of illustration.

FIG. 25 depicts installation tool 900, retaining member 540 and cover plate 750 with ends 709 of legs 710 of the installation tool pushed axially past an outside axial surface of cover plate 750 and retaining member 540 after having bent tabs 720 about 90 degrees. FIG. 26 depicts the cover plate connected to the retaining member after removal of the installation tool, with nut 11 omitted for ease of illustration. As indicated above, FIG. 8 depicts cover plate 750 connected to retaining member 540, which is engaged in the groove of nut 11.

After legs 710 deform tabs 720, radial extending portion 722 may be received in notches 600 of retaining member 540 while circumferential extending portions 724 may be located on an opposite side of retaining member 540 relative to remainder 656 of cover plate 650 such that ends 723 of circumferential extending portions 724 extend circumferentially outside notches 600 thereby inhibiting movement of the tabs through the notches in a direction away from nut 11. The extension of the circumferential portion outside the notch may inhibit separation of the retaining member from the cover plate (i.e., due to contact of circumferential extending portions 724 with retaining member 540) thereby providing a visible indication when such separation is attempted, and tabs 720 are thereby deformed or damaged. As depicted in FIGS. 11-16, tool 900 may include a handle 960 connected via a shaft 965 in an elongated portion 970 to body portion 930. After arms 910 are connected to nut 11 as described above via sleeve 950 being moved laterally (around elongated portion 970 and body portion 930) toward nut 11 to cause arms 910 to move toward one another, a user may rotate handle 960 to cause an extension of legs 710 to deform tabs 720 as described above. An extension of legs 710 is depicted in 13-16 with the nut, cover plate, and retaining member omitted for ease of illustration. Handle 960 may be connected to legs 710 via shaft 965 connected to a screw mechanism 922 to allow the movement of the legs in response to the movement of the handle.

Figure 19:
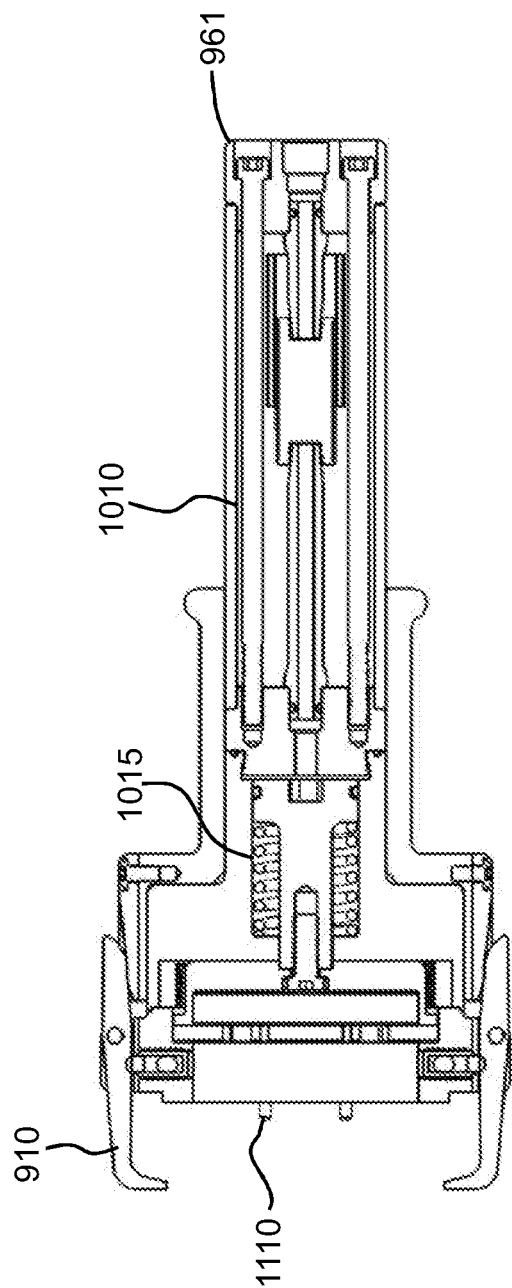
FIG. 19 is a side cross-sectional view of another example of a tool in accordance with the present invention.
Figure 20:
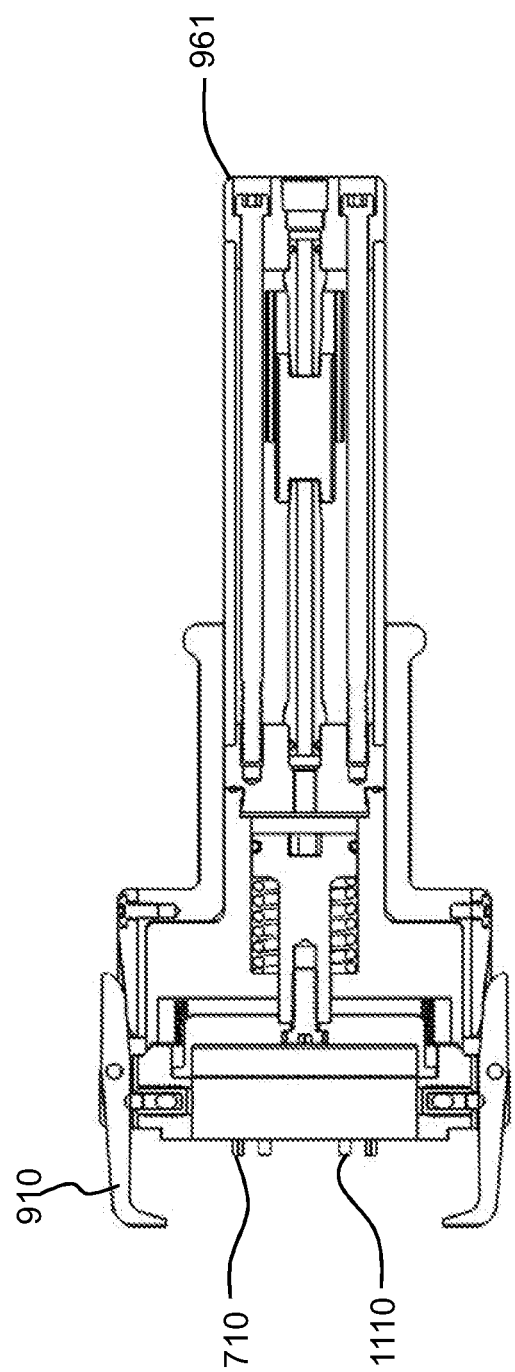
FIG. 20 is a side cross-sectional view of the tool of FIG. 19 with legs extending therefrom.

In another example depicted in FIGS. 19-20, a tool 1000 is identical to tool 900 except that screw mechanism 922, shaft 965, and handle 960 are replaced by a pneumatic mechanism 1010 and a resilient member 1015 (e.g., a spring). Identical reference numbers are used to identify identical parts in tool 900 and tool 1000. Similarly to FIGS. 13-17, FIGS. 19-20 depict arms 910 in a closed position after arms 910 are connected to nut 11 but with nut 11, retaining member 540 and cover plate 750 omitted for ease of illustration. FIG. 19 depicts tool 1000 after the legs are moved toward one another and connected to nut 11 with nut 11 not being depicted as indicated above. After connection of arms 910 to nut 11, pneumatic mechanism 1010 may be activated against a bias of resilient member 1015 to drive legs 710 to deform tabs 720 of cover plate 750. FIG. 20 depicts tool 1000 after the hydraulic mechanism has driven legs 710 to deform tabs 720 with nut 11, tabs 720 and retaining member 540 being omitted for clarity. A deactivation of the pneumatic mechanism may cause a retreat of legs 710 toward an end 961 due to a bias of resilient member 1015.

In other examples, cover plates (e.g., cover plate 750) could include tabs formed in any shape which inhibits separation of the cover plate from the retaining member and provides a visual indication when such separation is attempted. Further a tool (e.g., tool 900) could include any number of legs or pressing members configured to deform tabs of a cover plate to inhibit separation of the cover plate from a corresponding retaining member and provides a visual indication when such separation is attempted and/or has occurred. Moreover, the features of the cover plates (e.g., cover plate 750) described, such as tabs (e.g., tabs 720) openings (e.g., opening 711 and opening 712), could be located in different positions relative to each other such the features correspond to appropriate features of a retaining member to facilitate engagement of the cover plates and retaining members and to inhibit separation of one from another. Further, the features of the cover plates and retaining members may be located to facilitate engagement of an installation tool (e.g., tool 900) to one and/or the other. Similarly, features of an installation tool (e.g., tool 900) may be located to align such features (e.g., legs 710) with appropriate features (e.g., tabs 720, openings 711 and 712) of a cover plate and/or retaining member.

For example, the retaining members described above (e.g., retaining member 540) may be formed of stamped sheet metal, and may have a thickness in a range between 0.040-0.050 inches, as will be understood by those skilled in the art. Alternatively, the retaining members could be formed of other materials (e.g., powdered metal) and/or formed in other shapes to allow the retaining members to be received in slot 561 and to be connected to a keeper (e.g., keeper 540, keeper 1030) via a projection (e.g., projection 535). Further, the keepers may be formed or molded of powdered metal, for example. Alternatively, the keepers and retaining members could be formed integral or monolithic relative to one another.

Cover plates (e.g., cover plate 750) as described above may be formed of stainless steel. Further, keeper 530 and/or nut 11 may be fabricated from any one or more of the structural metals, for example, carbon steel or stainless steel. Nut 11 may be fabricated by machining from a billet or plate, by forging or casting and then finished machining, or fabricated by conventional powder metallurgy techniques. In one aspect, when formed by powder metallurgy, the material may be FC 0208, or its equivalent. Nut 11 may also be surface hardened for example, induction hardened, carburized, or nitrided, among other surface hardening methods; in one aspect, the exposed surfaces on outer surface 522 of nut 11 may be hardened, for example, induction hardened.

Although the tools above include drive mechanisms that are manually operated (e.g., screw mechanism 922, shaft 965, and handle 960) or pneumatic based (e.g., pneumatic mechanism 1010), other ways of causing legs (e.g., legs 710) to contact and deform the tabs (e.g., tabs 720) of a cover plate or tamper indicating member (e.g., cover plate 750) are envisioned including hydraulic, mechanical, or other ways of causing movement of such legs to deform tabs to connect a retaining member to a cover or tamper indicating member.

Returning to FIGS. 1-2, preload apparatus 20 includes an attaching mechanism, such as a shaft or rod 40 engageable with spindle 14 by a collar 46, and a press mechanism 44 for providing a compressive load to bearing 16. In addition, aspects of the invention provide means for monitoring the preload on the bearings to, for example, ensure that the desired preload is provided, in contrast to the unreliable and often inaccurate assumed preloading of the prior art.

Rod 40 may be configured to attach to exposed end 13 of shaft 14, for example, by collar 46, though other attachment means may be used. Press mechanism 44 may include an adjustment nut 48 which may be threaded to rod 40 (e.g., on external threads 41 (FIG. 1)) to mount press mechanism 44 to rod 40 and may provide a compressive load to press mechanism 44. Nut 48 may be adapted to facilitate rotation of nut 48, for example, nut 48 may include arms 50 and/or a hand wheel 51 that can assist a mechanic while manually tightening or untightening nut 48. In one aspect, nut 48 may be adapted to be rotated by an automated tool, for example, a drill or stepper motor (not shown). For example, nut 48 may be fashioned with a hex head or threads to engage an automated tool, for example, a torque motor (not shown).

As shown in FIGS. 1-2, press mechanism 44 includes a loading adapter 210. A compressive load from press mechanism 44 (e.g., from nut 48 thereof) is transmitted to bearing 16, and to bearing 18, by loading adapter 210. Further, loading adapter 210 works in conjunction with retaining nut 11 to provide a load to outboard bearing 16 (e.g., an inner race (not shown) thereof). Retaining nut 11 may have a recess that exposes the surface of inner race 15 and permits contact by, for example, loading adapter 210. For example, nut 11 may have a bottom curve or recessed portion 111 such that a bottom end of nut 11 has a smaller diameter than the remainder thereof. Loading adapter 210 may thus transmit the compressive load from press mechanism 44 (i.e., around nut 11) to bearing 16. In an unillustrated example, bearing 16 could be exposed thereby allowing load adapter 210 to be used with a conventional axle nut, as shown for example in FIG. 3 of co-owned application, U.S. Pat. No. 7,389,579 issued Jun. 24, 2008 (application Ser. No. 11/354,513, filed Feb. 15, 2006), and entitled "Method, Apparatus, And Nut For Preloading A Bearing". However, when bearing 16 would be concealed by such a conventional axle nut, retaining nut 11 may be used instead thereof according to aspects of the invention.

Figure 10:
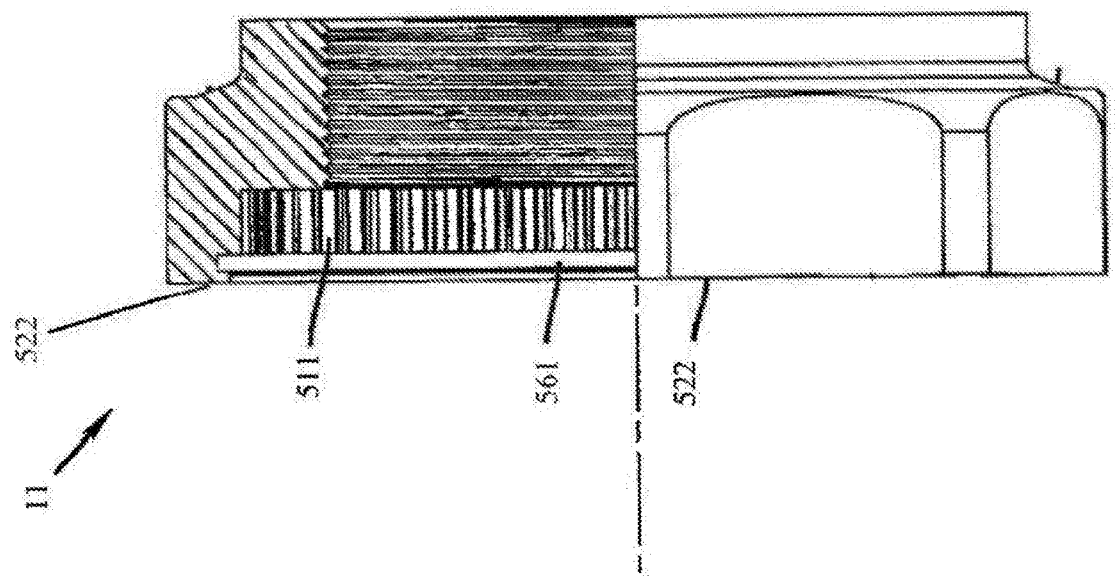
FIG. 10 is a side partial cross-sectional view of the retaining nut of FIG. 9.

As depicted in FIGS. 10-11 of indicated co-owned U.S. Pat. No. 8,316,530, loading adapter 210 includes a plate 211 and at least two extensions, fingers, or arms 212, 213 extending from plate 211. In this aspect of the invention, extensions 212 and 213 are adapted to transmit the load applied to plate 211, for example, by the compression of nut 48, to the bearing 16. Plate 211 typically includes a through hole or bore 214 that is adapted to receive rod 40. Plate 211 may also include a raised boss 215 adapted to contact press mechanism 44, for example, adapted to contact piston 54 or bearing 64 (FIG. 3). In one aspect, extensions 212 and 213 may be moveable or deflectable to facilitate assembly of adapter 210 into engagement with bearing 16. For example, extensions 212 and 213 may include any interface with plate 211 or modification to extensions 212 and 213 that permits extensions 212 and 213 to deflect to avoid interference with nut 11. Extensions 212 and 213 may be pivotally mounted to plate 211. Plate 211 may include two pairs of oppositely extending lugs or projections 216 having through holes 219, and projections 216 may include recesses 218 configured (e.g., shaped and dimensioned) to receive extensions 212 and 213. Pins 222 may be provided in holes 219 in projections 216 that engage holes (not shown) in extensions 212 and 213 whereby extensions 212, 213 may rotate about pins 222.

As further illustrated in the indicated co-owned patent, arms or extensions 212, 213 may include projections 225, 226, respectively, for example, arcuate projections adapted to engage the arcuate shape of bearing 16 (e.g., an inner race thereof). Loading adapter 210 may also include an aligning arm 205 configured (e.g., shaped and dimensioned) to engage shaft slot 5 (FIG. 2) of spindle 14, for example, as depicted in FIGS. 1-2. Aligning arm 205 may be utilized by a user as a reference point relative to retaining nut 11.

Press mechanism 44 may be any means that is configured to provide a compressive load (e.g., utilizing nut 48) to outboard bearing 16 (e.g., an inner race thereof). Further, press mechanism 44 may include a load sensor or any means for monitoring the compressive load transferred to bearing 16. For example, the indication of the compressive load transferred by press mechanism 44 may be provided mechanically, for example, by compression springs having a known spring constant, for example, coil springs or disc springs, and a deflection indicator, for example, a dial indicator, as is known in the art. In this aspect, the dial indicator may be mounted to detect and indicate the compression of one or more springs positioned in press mechanism 44 due to the advancement of nut 48, and the compression load calculated from the deflection indicated and the known spring constant of the springs used. This aspect of the invention may provide a reliable and repeatable means for monitoring the preload provided to inner race 15 of outboard bearing 16. The load sensor may be wired to an appropriate processor and display to, for example, provide a digital readout of the compressive load to the mechanic operating preload device 20. The transmission of signals from the sensor may also be practiced wirelessly, for example, by means of an RF signal. This aspect of the invention may also provide a reliable and repeatable means for monitoring the preload provided to bearing 16.

In one aspect of the invention, preload apparatus 20 may be used to apply and monitor a preload to outboard bearing 16. In a typical procedure, a wheel (not shown) may be dismounted from hub assembly 10, for example, which was mounted to studs on hub 10, as exemplified by stud 100 in FIGS. 1-4 of the indicated co-owned patent, U.S. Pat. No. 8,316,530. Apparatus 20 may be prepared by assembly and filling cavity 56 with a fluid, for example, oil, through an access port (not shown) similar to that occupied by pressure indicator 60. Nut 11 may be loosened or hand tightened prior to mounting apparatus 20, though any light load on nut 11 will typically be relieved with application of tension to spindle 14 by means of rod 40. Apparatus 20 is then mounted to hub assembly 10 by attaching rod 40 to spindle 14 by means of collar 46. As a result, extensions 212, 213 are brought into contact with bearing 16 (e.g., an inner race thereof). Assuming a desired compressive deflection for bearing 16, for example, 0.003 inches, and a corresponding preload, L, the desired target pressure in cavity 56 can be calculated as described in co-owned U.S. Pat. No. 8,316,530.

The loading of bearing 16 may be initiated by advancing, that, is tightening, nut 48, against housing 52 via bearing 62, for example, by means of arms 50. The buildup of pressure in cavity 56 as indicated by pressure indicator 60 may be monitored by the mechanic. The tightening of nut 48 continues until the target pressure is achieved. The hub assembly may be rotated at least once to provide proper seating of the rollers in bearing 16. For example, nut 48 including arm 50 may be rotated three revolutions and such nut handle may then be counter-rotated slightly to arrive at a desired pressure as indicated on a pressure sensor (e.g., gauge 60). Once the target pressure is achieved in cavity 56, and the desired preload is applied to bearing 16, nut 11 may be tightened (e.g., by hand) against inner race 15 to maintain the preload after apparatus 20 is removed. The desired tightening of nut 11 may be determined by positioning one or more of markings 510 on nut 11 relative to aligning arm 205. Also, the hub assembly may be rotated at least once to provide proper seating of the rollers in bearing 16. Upon completion of the preloading, apparatus 20 may be removed from wheel hub assembly 10 and, keeper 530 and retaining member 540 may be engaged with retaining nut 11 and spindle 14 such that keeper teeth 520 engage teeth 511 of nut 11 and engaging member 534 of keeper 530 engage shaft slot 5 of spindle 14. As indicated above, nut 11 may be selectively rotated based on markings 510 and aligning arm 205 such that keeper teeth 520 and engaging teeth 511 engage one another and engaging member 534 engages shaft slot 5 in a manner to inhibit movement of spindle 14 relative to retaining nut 11. As described above, a cover plate or locking member (e.g., cover plate 750) may be utilized to allow a visual inspection of any potential tampering of the endplay of the wheel hub assembly. The wheel may then, for example, be remounted. Variations on this procedure while not deviating from the desired results may be apparent to those of skill in the art.

Another example of a press mechanism usable to provide a compressive load on a bearing is described in co-owned U.S. application Ser. No. 15/071,570, filed Mar. 16, 2016, and titled "Systems and Methods For Preloading A Bearing And Aligning A Lock Nut".

The preloading of the bearings as described above is advantageous relative to endplate adjustment but was rarely recommended prior to the invention disclosed in co-owned U.S. Pat. No. 8,316,530, due to the difficulty of creating and verifying a correct preload site. The use of a load sensor such as a pressure indicator or gauge 60 along with the selective positioning of retaining nut 11 on spindle 14 (e.g., using arm 205 and markings 510) provide for a repeatable correct and accurate preload setting.

Aspects of the invention may also be used to evaluate the preload or endplay on an existing bearing or bearing assembly. For example, an existing truck hub assembly may be evaluated for its existing preload and compared to the desired preload, and, if necessary, adjusted accordingly. First, the truck may be jacked up, if needed. (The hub may be allowed to cool, if necessary). Apparatus 20 may then be mounted to bearing 16 and spindle 14 (with reference to FIGS. 1-4) and the press mechanism 44 actuated to introduce tension to spindle 14 and compression to bearing 16. (The wheel may be removed.) Press mechanism 44 may be regulated to, for example, vary the fluid pressure, to gradually increase the preload on bearing 16. While the load is increased, a mechanic can repeatedly check the load on or the "tightness" of nut 11. When nut 11 begins to loosen, the existing preload on bearing 16 has been met or exceeded. A comparison of the actual preload indicated by press mechanism 44, for example, the fluid pressure, with the desired preload can then be made. Any adjustments to the preload, either higher or lower, can be made according to the procedures described above and in co-owned U.S. Pat. No. 7,389,579 and co-pending U.S. application Ser. No. 13/719,569 filed on Dec. 19, 2012.

Although aspects of the present invention were described above with respect to their application to wheel hub assemblies, for example, truck wheel hub assemblies, it is understood that aspects of the present invention may be applied to any vehicle, machine, or component having at least one bearing. Further, although press mechanism 44 is described above as applying a compressive load to an inner race of a bearing, such load could be applied elsewhere to the bearing or wheel assembly 10 such that a frictional or other load on a retaining nut is reduced to allow rotation of a retaining nut. Such rotation may allow teeth of the nut and teeth of a keeper to be aligned with each other to allow engagement of a shaft engaging portion of the keeper with a shaft, (e.g., a shaft slot thereof) to inhibit rotation of the nut relative to the shaft.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. An apparatus for use in connecting a cover member to a retaining member coupled to a nut mounted to a shaft, the apparatus comprising:
   a body portion;
   at least one pressing member extending from said body portion and alignable with one or more of tabs of a cover member when said cover member is located between said body portion and said nut,
   a drive mechanism configured to cause said at least one pressing member to contact a first tab of the cover member to deform said first tab toward a retaining member coupled to the nut mounted on the shaft, and
   a sleeve coaxial relative to said body portion and axially movable along said body portion such that one or more engaging members coupled to the body portion contact the nut to connect said body portion to said nut.

2. The apparatus of claim 1 wherein said one or more engaging members are biased to allow said one or more members to move around said nut.

3. The apparatus of claim 2 wherein said sleeve causes said engaging members to move toward the nut when an end of said sleeve is moved axially.

4. The apparatus of claim 1 wherein said one or more engaging members comprise contacting portions configured to allow said contacting portions to extend behind the nut to contact the rear side of the nut.

5. The apparatus of claim 1 wherein said one or more engaging members are pivotally connected to said body portion and biased by a plurality of resilient members away from each other to allow said engaging members to move around said nut.

6. The apparatus of claim 1 wherein said drive mechanism comprises a handle connected to a nut threaded onto a rod of said body portion.

7. The apparatus of claim 1 wherein said drive mechanism comprises a hydraulic pressing mechanism.

8. The apparatus of claim 1 wherein said sleeve is biased in a direction away from said engaging members by a resilient member.

9. The apparatus of claim 1 wherein said body portion comprises aligning pins extending axially to receive aligning holes of cover member to align said pressing member with said first tab.

10. The apparatus of claim 1 wherein said cover member comprises a tamper indicating member.

11. The apparatus of claim 1 wherein said one or more engaging members comprise arms.

* * * * *